US010169752B2

(12) United States Patent
Katsumura

(10) Patent No.: US 10,169,752 B2
(45) Date of Patent: Jan. 1, 2019

(54) MERCHANDISE ITEM REGISTRATION APPARATUS, AND MERCHANDISE ITEM REGISTRATION METHOD

(71) Applicant: CASIO COMPUTER CO., LTD., Tokyo (JP)

(72) Inventor: Noriyoshi Katsumura, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 469 days.

(21) Appl. No.: 14/856,825

(22) Filed: Sep. 17, 2015

(65) Prior Publication Data
US 2016/0086148 A1    Mar. 24, 2016

(30) Foreign Application Priority Data

Sep. 22, 2014  (JP) .................................. 2014-192528

(51) Int. Cl.
| G06Q 20/20 | (2012.01) |
| G06Q 20/40 | (2012.01) |
| G06K 9/46 | (2006.01) |
| G06K 9/62 | (2006.01) |
| G07G 1/00 | (2006.01) |
| G06G 1/00 | (2006.01) |

(52) U.S. Cl.
CPC ......... *G06Q 20/208* (2013.01); *G06K 9/4652* (2013.01); *G06K 9/6271* (2013.01); *G06Q 20/407* (2013.01); *G07G 1/0054* (2013.01)

(58) Field of Classification Search
None
See application file for complete search history.

(56) References Cited

U.S. PATENT DOCUMENTS

| 6,488,207 B1* | 12/2002 | Kawai | ................ G01G 19/4144 235/383 |
| 2011/0276422 A1* | 11/2011 | Fergen | .................. G06Q 20/20 705/23 |
| 2014/0177912 A1* | 6/2014 | Okamura | ........... G06K 9/00624 382/103 |

FOREIGN PATENT DOCUMENTS

| JP | 06243282 A | * | 9/1994 |
| JP | H06-243282 A | | 9/1994 |

(Continued)

OTHER PUBLICATIONS

Notification of Reasons for Refusal dated Oct. 10, 2017 received in Japanese Patent Application No. JP 2014-192528 together with an English language translation.

*Primary Examiner* — Scott A Zare
(74) *Attorney, Agent, or Firm* — Scully, Scott, Murphy & Presser, P.C.

(57) ABSTRACT

A merchandise item registration apparatus includes: a left photoelectric sensor that senses an object in a first area located on one side of a recognition area for merchandise items in a merchandise item identification device; a right photoelectric sensor that senses the object in a second area located on the other side of the recognition area; and a camera that captures an image of the recognition area. A merchandise item is identified by sensing the object from the image of the recognition area captured by the camera, and a POS terminal is made to perform a merchandise item registration process or a provisional registration cancellation process in accordance with the temporal sequence of results of the sensing performed by the camera in the respective areas.

10 Claims, 17 Drawing Sheets

(56) References Cited

FOREIGN PATENT DOCUMENTS

| JP | 2010-026745 A | | 2/2010 |
|---|---|---|---|
| JP | 2010026745 A | * | 2/2010 |
| JP | 2013-182323 A | | 9/2013 |
| JP | 2013-182457 A | | 9/2013 |
| JP | 2014-089669 A | | 5/2014 |

* cited by examiner

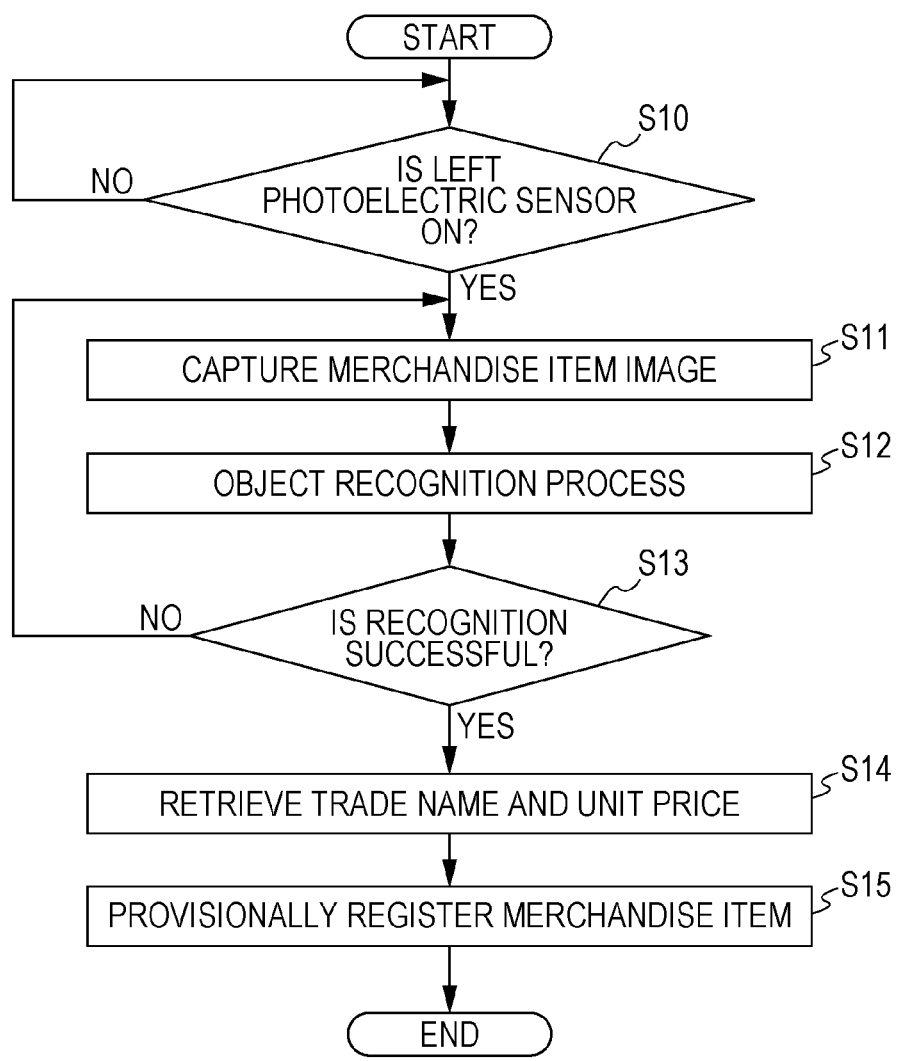

MERCHANDISE ITEM REGISTRATION APPARATUS, AND MERCHANDISE ITEM REGISTRATION METHOD

BACKGROUND OF THE INVENTION

Technical Field

The present invention relates to a merchandise item registration apparatus that registers sales of merchandise items, and a merchandise item registration method.

Related Art

A conventional electronic cash register (a merchandise item registration apparatus) identifies a merchandise item by reading a data code such as a bar code attached to the merchandise item with a bar-code reader. The bar code attached to the merchandise item includes maker code information, item code information, and check digit information. After determining from the check digit information that the bar code has been correctly read, the merchandise item registration apparatus identifies the merchandise item from the item code information. As the bar code is printed on the package of the merchandise item in advance, the load on the operator of the cash register can be reduced.

However, it is extremely troublesome to attach a bar code to each of unwrapped merchandise items such as fruits and vegetables, and doing so is time-consuming and costly. As for fruits and vegetables, an operator types item codes and prices at a keyboard in a conventional operation.

In recent years, merchandise item registration apparatuses that identify fruits and vegetables as objects, and register sales of identified merchandise items have been becoming common. Such a merchandise item registration apparatus extracts an external feature amount from information in an image showing a fruit or a vegetable, and compares the extracted feature amount with a predetermined feature amount database. By doing so, the merchandise item registration apparatus determines to which merchandise item the article corresponds. Accordingly, the merchandise item registration apparatus can recognize unwrapped merchandise items, even though bar codes are not attached to the respective merchandise items. Thus, the load on the store can be reduced.

When a customer purchases merchandise items at a supermarket, the customer puts the merchandise items into a shopping basket or the like, and asks the operator of a cash register for checkout.

To register the sales of the merchandise items, the operator of the cash register controls a merchandise item registration apparatus to sequentially read the respective merchandise items in a first shopping basket related to the customer, and puts the merchandise items into a second shopping basket. If the customer asks for cancellation of one of the merchandise items at this point, the operator needs to operate a keyboard to correct the registration of the merchandise item. This operation is not a regular operation, and therefore, the operator has not yet learned this operation in many cases. Therefore, the chief operator or the like is fetched to conduct the cancellation, and a large number of steps and a long time are required for the cancellation. This problem is common between a merchandise item registration apparatus having a bar-code reading function and a merchandise item registration apparatus having an object recognition function.

JP 2013-182323 A discloses a solution "including: a similarity calculating unit that calculates a degree of similarity between an image of an object included in a frame image and a reference image of each of the merchandise items registered in a dictionary, the frame image including the image of the object captured by an imaging unit; a candidate merchandise item extracting unit that extracts candidates from the registered merchandise items corresponding to the object based on the degree of similarity; a determining unit that confirms a candidate registered merchandise item to be a provisionally-determined merchandise item when the number of candidate registered merchandise items is one, or determines a selected one of the candidate registered merchandise items to be a provisionally-determined merchandise item when there are two or more candidate registered merchandise items, and determines the provisionally-determined merchandise item to be the registered merchandise item corresponding to the object; and a special process executing unit that executes a special process set beforehand for the provisionally-determined merchandise item when the attribute of the color of the frame image exceeds a predetermined reference value prior to the determination made by the determining unit, or when the variation per unit time in the attribute of the color exceeds a predetermined reference value prior to the determination made by the determining unit.

JP 2013-182457 A discloses an objective to "increase the efficiency of operation for processing related to a result of object recognition", and the solution thereto reads "A merchandise item reading device of an embodiment includes a recognizing unit, an identifying unit, a determining unit, a processing unit, and a confirming unit. The recognizing unit recognizes objects included in an image captured by the imaging unit. From the objects recognized by the recognizing unit, the identifying unit identifies candidate merchandise items as candidates for a purchased merchandise item. The determining unit determines a variation pattern of a specific object among the objects recognized by the recognizing unit in the image. The processing unit performs processing related to the variation pattern determined by the determining unit, in accordance with the result of the identification performed by the identifying unit. When a predetermined confirmation condition is satisfied, the confirming unit confirms the item code for identifying a candidate merchandise item among the candidate merchandise items as the item code of the purchased merchandise item."

According to the invention disclosed in JP 2013-182323 A, an operator can cancel registration of a merchandise item, without any keyboard operation. However, in the invention disclosed in JP 2013-182323 A, the operator needs to put his/her hand over an object recognition camera, to cancel registration of a merchandise item. The operation in which the operator puts one hand over the camera is not an intuitive operation as a canceling operation, and is difficult to learn. Also, if the operator does not know of this operation, it is not possible to cancel registration of a merchandise item, either.

According to the invention disclosed in JP 2013-182457 A, an operator can cancel registration of a merchandise item, without any keyboard operation. However, the invention disclosed in JP 2013-182457 A utilizes variations in recognized objects when registration of a merchandise item is canceled. Therefore, there is a possibility that various kinds of operations are performed as a result of false recognition of objects.

Also, a merchandise item registration apparatus having a bar-code reading function cannot recognize the above described operation, and therefore, registration of a merchandise item is not canceled.

SUMMARY OF THE INVENTION

Therefore, the present invention is to provide a merchandise item registration apparatus capable of a merchandise item registering operation that is an intuitive operation and results in few false operations, and of an operation to cancel the merchandise item registering operation.

A merchandise item registration apparatus includes: a sensing unit configured to sense an object in a sensing area adjacent to a recognition area for merchandise items; an imaging unit configured to capture an image of the recognition area; and a control unit configured to identify a merchandise item by sensing the object from the image of the recognition area captured by the imaging unit, and perform one of a merchandise item registration process and a cancellation process in accordance with a temporal sequence of respective results of the sensing performed in the sensing area and the recognition area.

According to the present invention, it is possible to provide a merchandise item registration apparatus capable of a merchandise item registering operation that is an intuitive operation and results in few false operations, and of an operation to cancel the merchandise item registering operation.

BRIEF DESCRIPTION OF THE DRAWING

FIG. 6 is a flowchart showing a merchandise item registration process according to the first embodiment;

DETAILED DESCRIPTION OF THE PREFERRED EMBODIMENTS

Figure 1:
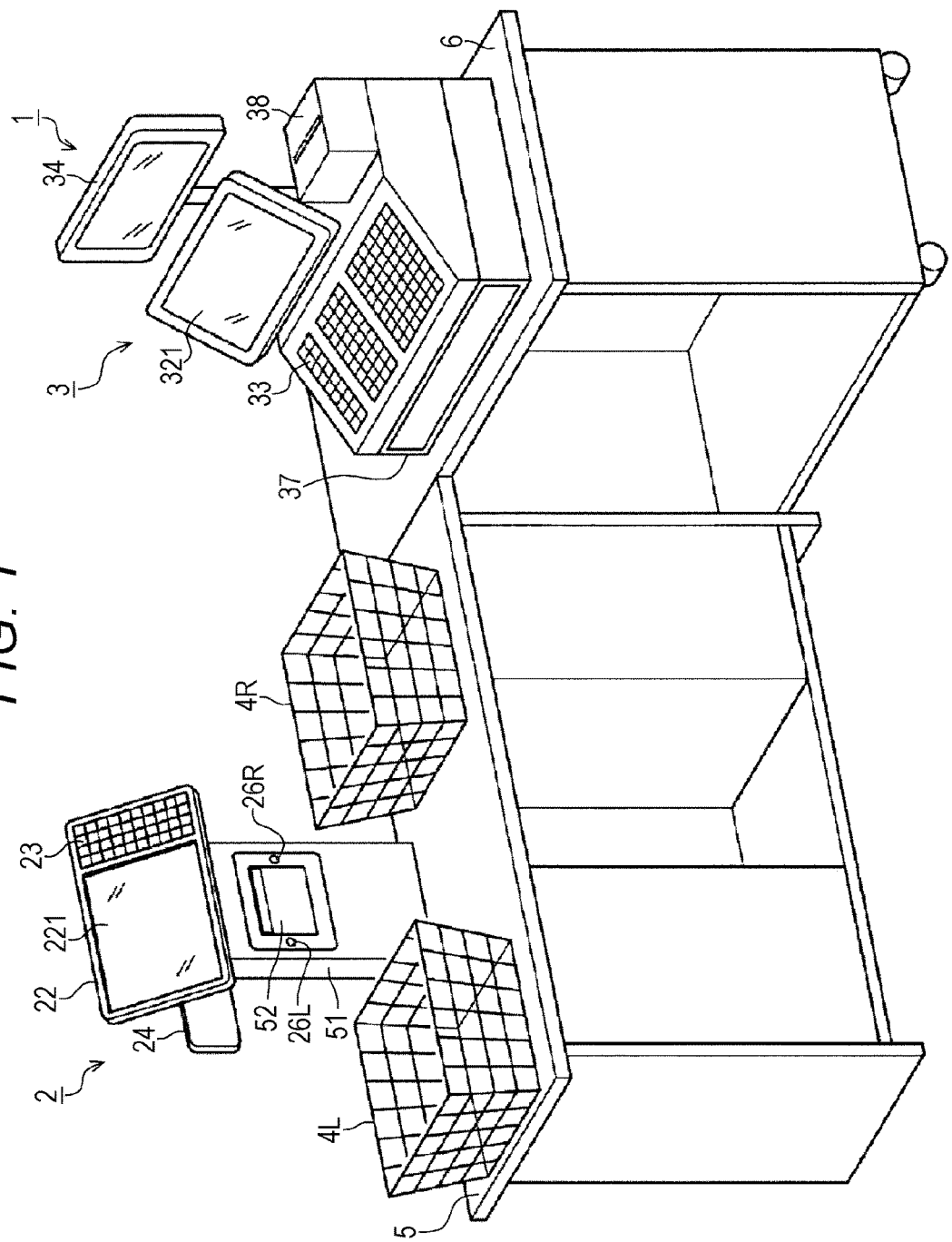
FIG. 1 is a perspective view of the exterior of a merchandise item registration apparatus according to a first embodiment.

The following is a detailed description of embodiments for carrying out the present invention, with reference to the respective accompanying drawings. Like components shown in different drawings are denoted by like reference numerals, and explanation of them might not be repeated more than once.

First Embodiment

FIG. 1 is a perspective view of the exterior of a merchandise item registration apparatus 1 according to a first embodiment.

As shown in FIG. 1, the merchandise item registration apparatus 1 includes a merchandise item identification device 2 that registers respective merchandise items, and a POS terminal 3 that registers sales of merchandise items related to respective transactions, and adjusts accounts. The merchandise item identification device 2 is a POS connecting scanner that reads and registers information about merchandise items.

The merchandise item identification device 2 is placed at the center of a horizontally-long counter table 5 in terms of the longitudinal direction. The merchandise item identification device 2 has a thin, rectangular housing 51. A camera 27 (see FIG. 2) covered with a read window 52 is formed in the front surface of the housing 51. A left photoelectric sensor 26L is provided on the left side of the read window 52. A right photoelectric sensor 26R is provided on the right side of the read window 52.

A display/operation unit 22 is attached to the upper portion of the housing 51. A display 221 is provided on the display/operation unit 22. A touch panel 222 (see FIG. 2) is stacked on the surface of the display 221. A keyboard 23 is placed to the right of the display 221. The card read groove of a card reader (not shown) is formed to the right of the keyboard 23. A customer display 24 for providing customers with information is placed behind and on the left side of the display/operation unit 22, with the front side of the customer display 24 facing backward.

The POS terminal 3 is placed on the upper surface of a drawer 37 on a checkout table 6. Opening and closing of the drawer 37 are controlled by the POS terminal 3.

A keyboard 33 for an operator (a store clerk) to operate is placed on an upper surface of the POS terminal 3. A display 321 for displaying information is located behind and above the keyboard 33, when seen from the operator. A touch panel 322 (see FIG. 2) is stacked on the surface of the display 321. A customer display 34 for displaying information is provided behind the display 321 in such a manner that the customer display 34 can rotate to the right and to the left. It should be noted that the customer display 34 shown in FIG. 1 faces the front in the drawing. The customer display 34 is rotated to face backward in the drawing and display information to a customer.

The horizontally-long counter table 5 is placed so as to form an L-shape with the checkout table 6 having the POS terminal 3 mounted thereon. A merchandise receiving surface is formed on the upper surface of the counter table 5. While walking from left to right in FIG. 1, a customer goes through a merchandise item registration process. Specifically, a first shopping basket 4L and a second shopping basket 4R for holding merchandise items are placed on the merchandise receiving surface of the counter table 5. Hereinafter, the first shopping basket 4L and the second shopping basket 4R will be referred to simply as the shopping baskets 4, unless there is a need to distinguish them from each other. These shopping baskets 4 are not necessarily "baskets", but may be trays or the like. Alternatively, the shopping baskets 4 may be boxes or bags.

The first shopping basket 4L is brought in by a customer, and merchandise items related to one transaction are held therein. The second shopping basket 4R is placed in a position on the opposite side of the merchandise item identification device 2 from the first shopping basket 4L. The merchandise items in the first shopping basket 4L are taken out therefrom by the operator operating the merchandise item identification device 2, and are transferred into the second shopping basket 4R. In this process of transfer, the merchandise items are passed over the read window 52 of the merchandise item identification device 2. At this point, the camera 27 (see FIG. 2) placed behind the read window 52 captures an image of each of the merchandise items.

In the merchandise item identification device 2, a screen for indicating to which merchandise item recorded in the later described feature amount file 361 (see FIG. 2) the merchandise item included in an image captured by the camera 27 corresponds is displayed on the display 221. The merchandise item identification device 2 further notifies the POS terminal 3 of the merchandise item ID of the indicated merchandise item. Based on the merchandise item ID sent from the merchandise item identification device 2, the POS terminal 3 records information about sales registration of the merchandise item corresponding to the merchandise item ID, such as the merchandise classification, the trade name, and the unit price of the merchandise item, into a sales master file (not shown) or the like. In this manner, sales registration is conducted.

Figure 2:
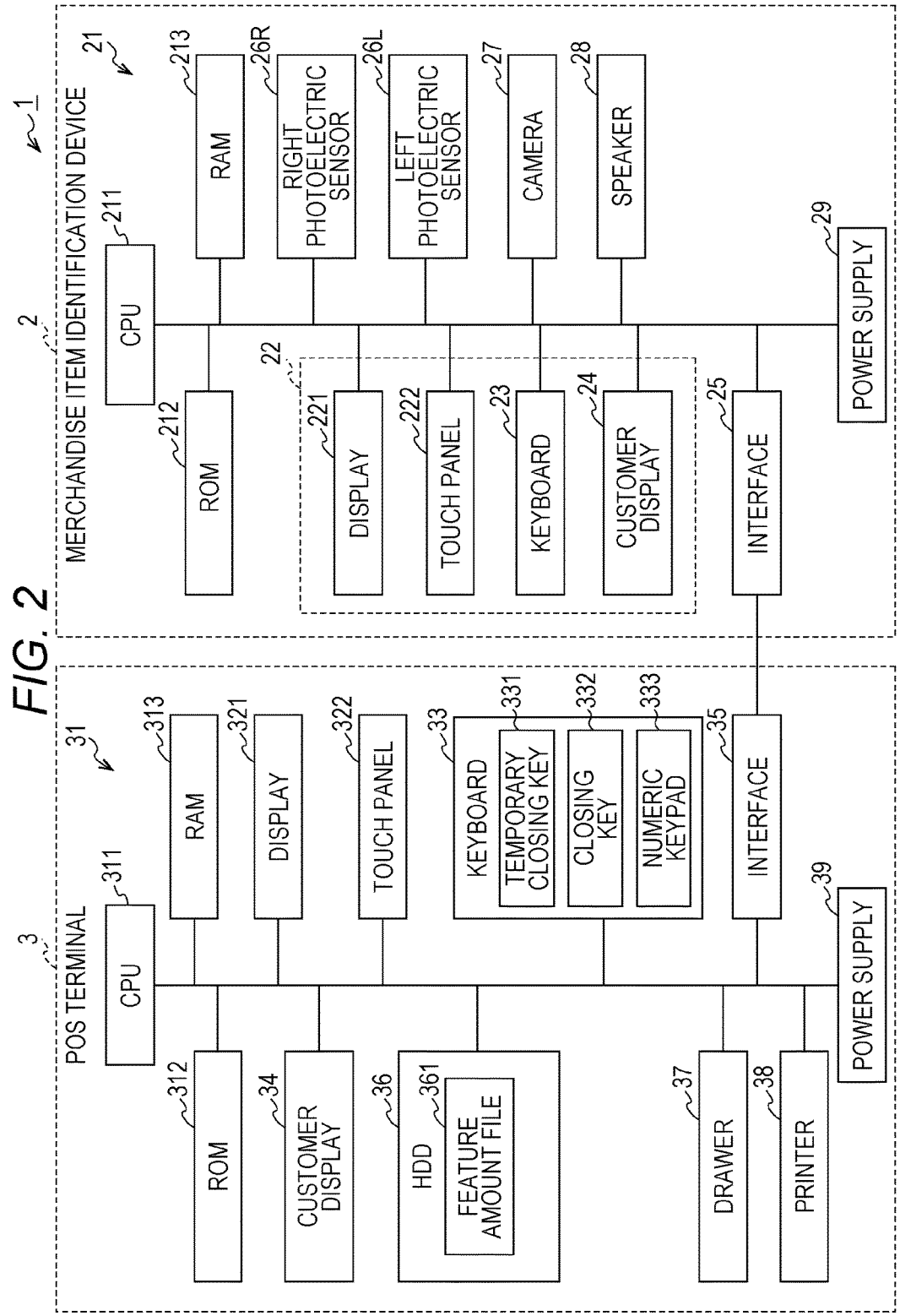
FIG. 2 is a diagram schematically showing the structure of the merchandise item registration apparatus according to the first embodiment.

FIG. 2 is a diagram schematically showing the structure of the merchandise item registration apparatus 1 according to the first embodiment.

The merchandise item registration apparatus 1 includes the merchandise item identification device 2 and the POS terminal 3.

The merchandise item identification device 2 includes a microcomputer 21, the display/operation unit 22, an interface 25, the left photoelectric sensor 26L, the right photoelectric sensor 26R, the camera 27, a speaker 28, and a power supply 29.

The microcomputer 21 is formed by connecting a ROM (Read Only Memory) 212 and a RAM (Random Access Memory) 213 to a CPU (Central Processing Unit) 211 with a bus. Programs to be executed by the CPU 211 are stored in the ROM 212.

The display/operation unit 22, the interface 25, the right photoelectric sensor 26R, the left photoelectric sensor 26L, the camera 27, and the speaker 28 are connected to the CPU 211 via an internal bus and respective input/output circuits (not shown).

The display/operation unit 22 includes the display 221, the touch panel 222, the customer display 24, and the keyboard 23, and operation thereof is controlled by the CPU 211.

The display 221 displays information to the operator in accordance with an instruction from the CPU 211. The touch panel 222 receives an operation input corresponding to the information displayed on the display 221. The customer display 24 displays information to the customer in accordance with an instruction from the CPU 211.

The keyboard 23 is formed with operation keys, and receives operation inputs from the operator.

The interface 25 is connected to an interface 35 of the POS terminal 3, so as to enable data transmission and reception to and from the POS terminal 3.

Each of the left photoelectric sensor 26L and the right photoelectric sensor 26R is a photoelectric sensor of a diffuse reflection type, for example, and is formed by integrating a projector and a receiver. When light emitted from this projector impinges on an object (a merchandise item) to be detected, the light reflected from this object enters the receiver, and the amount of light increases. Accordingly, this object is detected.

The camera 27 is a color CCD image sensor, a color CMOS image sensor, or the like, and, under the control of the CPU 211, serves as an imaging unit that performs imaging through the read window 52 (see FIG. 1). The camera 27 captures an image of a 30-fps moving image, for example. Frame images (captured images) sequentially captured by the camera 27 at a predetermined frame rate are stored into the RAM 213.

The speaker 28 generates a predetermined warning sound and the like. Under the control of the CPU 211, the speaker 28 issues a warning through a warning sound or voice.

The power supply 29 supplies electric power to the respective components of the merchandise item identification device 2.

The interface 25 is connected to an interface 35 of the POS terminal 3, so as to enable data transmission and reception to and from the POS terminal 3.

The POS terminal 3 includes a microcomputer 31, the display 321, the touch panel 322, the keyboard 33, the customer display 34, the interface 35, an HDD 36, the drawer 37, a printer 38, and a power supply 39.

The microcomputer 31 performs information processing. The microcomputer 31 is formed by connecting a ROM 312 and a RAM 313 to a CPU 311 with a bus. The CPU 311 performs respective calculation processes, and controls the respective components. The drawer 37, the keyboard 33, the display 321, the touch panel 322, the customer display 34, and the HDD (Hard Disk Drive) 36 are connected to the CPU 311 via an internal bus and respective input/output circuits. These components are controlled by the CPU 311.

The display 321 displays information to the operator in accordance with an instruction from the CPU 311. The touch panel 322 receives an operation input corresponding to the information displayed on the display 321. The customer display 34 displays information to the customer in accordance with an instruction from the CPU 311.

The keyboard 33 includes a temporary closing key 331, a closing key 332, and a numeric keypad 333, and receives operation inputs from the operator. The numeric keypad 333 is formed with the numeric keys of 0 through 9, and various kinds of operator keys.

Programs and various kinds of files are stored in the HDD 36. All or some of the programs and the various files stored in the HDD 36 are copied into the RAM 313 and are executed by the CPU 311 when the POS terminal 3 is activated. The feature amount file 361 is recorded in the HDD 36, for example, but a program for processing merchandise sales data may be recorded in the HDD 36. The feature amount file 361 is a merchandise item file in which information about sales registration of the respective merchandise items available in the store is associated with images of the respective merchandise items, and functions as a dictionary of the available merchandise items.

The interface 35 is connected to the merchandise item identification device 2, so as to enable data transmission and reception to and from the merchandise item identification device 2.

The printer 38 performs printing on receipts or the like. Under the control of the CPU 311, the POS terminal 3 prints the contents of respective transactions on receipts.

The power supply 39 supplies electric power to the respective components of the POS terminal 3.

Figure 3:
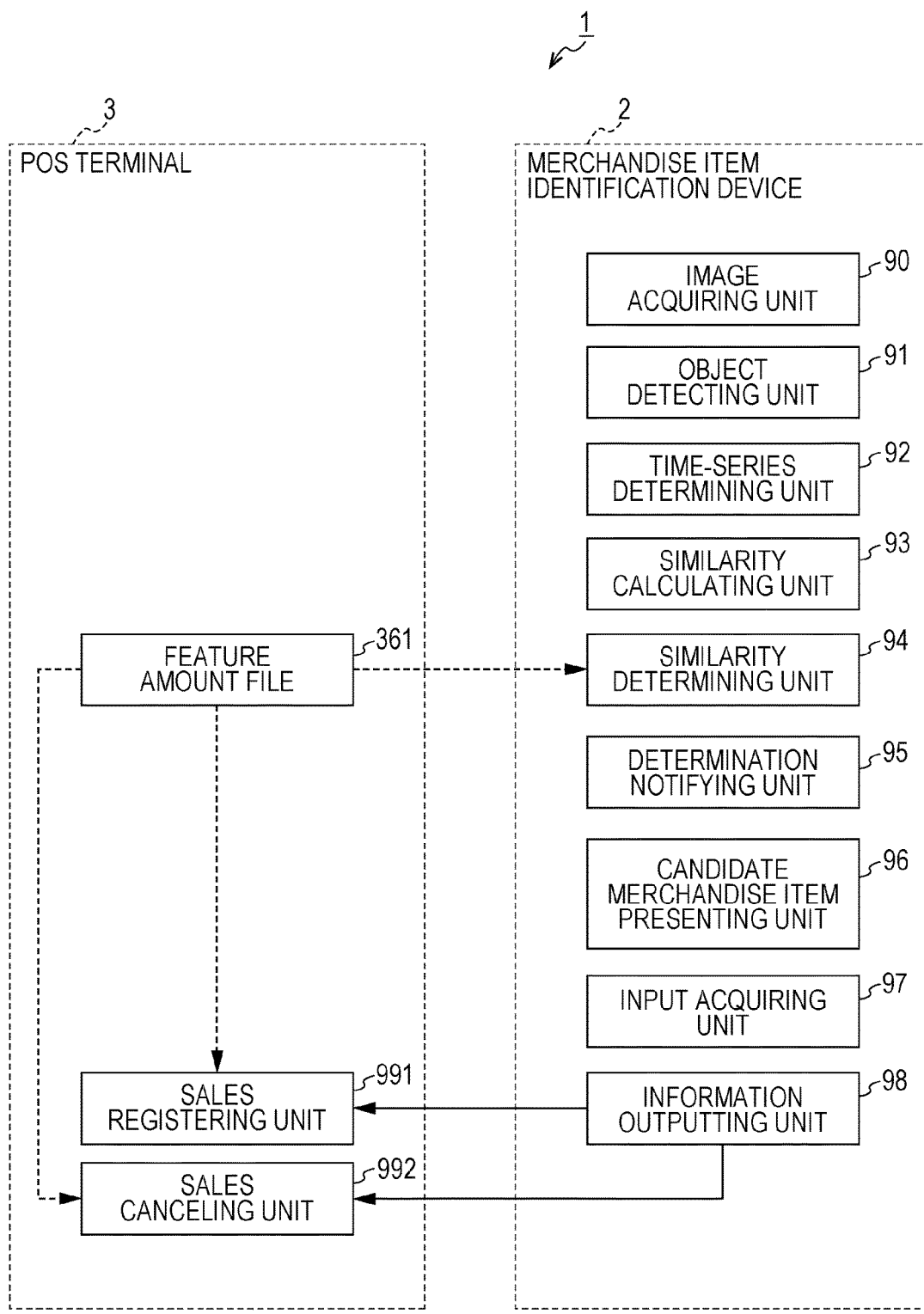
FIG. 3 is a functional block diagram schematically showing the merchandise item registration apparatus according to the first embodiment.

FIG. 3 is a functional block diagram schematically showing the merchandise item registration apparatus 1 according to the first embodiment. In the description below, FIGS. 1 and 2 will be referred to as necessary.

The CPU 211 of the merchandise item identification device 2 executes a program stored in the ROM 212, to embody the respective components of an image acquiring unit 90, an object detecting unit 91, a time-series determining unit 92, a similarity calculating unit 93, a similarity determining unit 94, a determination notifying unit 95, a candidate merchandise item presenting unit 96, an input acquiring unit 97, and an information outputting unit 98. Likewise, the CPU 311 of the POS terminal 3 executes a program stored in the HDD 36, to embody the respective components of a sales registering unit 991 and a sales canceling unit 992. The HDD 36 of the POS terminal 3 further stores the feature amount file 361.

The image acquiring unit 90 outputs an imaging on-state signal to the camera 27, to cause the camera 27 to start an imaging operation. Further, the image acquiring unit 90 sequentially acquires frame images that have been captured by the camera 27 and been stored into the RAM 213. The image acquiring unit 90 acquires the frame images in the same order as the order of storing in the RAM 213.

The object detecting unit 91 detects all or some of the objects included in the frame images acquired by the image acquiring unit 90, using a pattern matching technique or the like.

Specifically, when the operator holds a merchandise item in front of the read window 52 to conduct sales registration, the image acquiring unit 90 takes an image of this merchandise item with the camera 27. The object detecting unit 91 digitizes an acquired frame image, and extract the contour. The object detecting unit 91 then compares the contour extracted from the previous frame image with the contour extracted from the current frame image, and detects the object that is the merchandise item.

Another specific method is described below. When the operator holds a merchandise item in front of the read window 52 with one hand to conduct sales registration, the image acquiring unit 90 takes an image of this merchandise item and the hand with the camera 27. The object detecting unit 91 determines whether there is a skin-color region in an acquired frame image. If a skin-color region is detected, or if the hand of the store clerk is detected, the object detecting unit 91 detects the contour near the skin-color region. In this manner, the contour of the merchandise item considered to be held with the hand of the operator is extracted. In a case where the contour indicating the shape of a hand is detected, and the contour of an object existing near the contour of the hand is further detected, the object detecting unit 91 detects a merchandise item from the contour of the object.

The time-series determining unit 92 determines a corresponding process from a result of object sensing performed by the right photoelectric sensor 26R, a result of object sensing from an image captured by the camera 27, and a result of object sensing performed by the left photoelectric sensor 26L.

The similarity calculating unit 93 reads the surface state such as the color shade or the surface irregularities of a merchandise item as a feature amount from an image of the merchandise item captured by the camera 27. The similarity calculating unit 93 does not take into account the contour and the size of this merchandise item. In this manner, the similarity calculating unit 93 can shorten the processing time.

From merchandise item images of the respective merchandise items recorded in the feature amount file 361 (these merchandise items will be hereinafter referred to as the available merchandise items), the similarity calculating unit 93 further reads the surface states such as the color shades and the surface irregularities of the available merchandise items as feature amounts, and compares the feature amounts with the feature amount of an imaged merchandise item, to calculate the degrees of similarity between the imaged merchandise item and the available merchandise items recorded in the feature amount file 361. Where merchandise item images to be supposedly obtained from the respective merchandise items recorded in the feature amount file 361 each have the degree of similarity of 100%, the degrees of similarity calculated here indicate how similar all or some of images of merchandise items are to those merchandise item images. Alternatively, the similarity calculating unit 93 may calculate the degrees of similarity while changing the weights of the color shades and the surface irregularities, for example.

Recognizing an object included in an image in the above manner is called generic object recognition. In "The Current State and Future Directions on Generic Object Recognition" by Keiji Yanai, data set and evaluation benchmark tests are conducted by taking into account the surveys on generic object recognition studies, and future directions of generic object recognition are predicted:

Keiji Yanai, "The Current State and Future Directions on Generic Object Recognition", [online] IPSJ Transaction, Nov. 15, 2007, Vol. 48, No. SIG16, pp. 1-24, [Retrieved on Sep. 8, 2014], <URL:http://mm.cs.uec.ac.jp/IPSJ-TCVIM-Yanai.pdf>

A technique for performing generic object recognition by dividing an image into regions for each object is disclosed in the following literature:

Jamie Shotton, et al., "Semantic Texton Forests for Image Categorization and Segmentation", Computer Vision and Pattern Recognition, 2008. CVPR 2008. IEEE Conference on, [retrieved on Sep. 8, 2014], <URL:http://citeseerx.ist.psu.edu/viewdoc/download?doi=10.1.1.145.3036&rep=rep1& type=pdf>.

It should be noted that there are no particular limits on the method of calculating the degrees of similarity between a captured image of a merchandise item and the merchandise item images of the available merchandise items recorded in the feature amount file 361. For example, the degrees of similarity between a captured image of a merchandise item and the respective available merchandise items recorded in the feature amount file 361 may be calculated as absolute evaluations, or may be calculated as relative evaluations.

In a case where degrees of similarity are calculated as absolute evaluations, a captured image of a merchandise item is compared with the respective available merchandise items recorded in the feature amount file 361 one by one, and the degrees of similarity obtained as a result of this comparison can be employed as they are. In a case where degrees of similarity are calculated as relative evaluations, the calculation is performed so that the total sum of the degrees of similarity to the respective available merchandise items becomes 1.0 (100%). For example, four merchandise items #1 through #4 are recorded in the feature amount file 361. A merchandise item imaged at this point is 0.65 in degree of similarity to the merchandise item #1, is 0.2 in degree of similarity to the merchandise item #2, is 0.1 in degree of similarity to the merchandise item #3, and is 0.05 degree of similarity to the merchandise item #4, for example.

For each frame image acquired by the image acquiring unit 90, the similarity determining unit 94 compares the degrees of similarity between the image of the merchandise item and the merchandise item images recorded in the feature amount file 361. In this embodiment, several conditions are set on the degrees of similarity between the merchandise item images of the available merchandise items and a captured image of a merchandise item. The similarity determining unit 94 determines an available merchandise item or selects candidate merchandise items in accordance with satisfied conditions among the above conditions. The conditions on the degrees of similarity are not particularly limited, but conditions X, Y, and Z are used in the description below.

The condition X and the condition Y are the conditions for determining that the object in a frame image is one of the available merchandise items recorded in the feature amount file 361. The condition Z is the condition for extracting candidates for the object in a frame image from the available merchandise items recorded in the feature amount file 361.

For example, the similarity determining unit 94 determines that the available merchandise item satisfying the condition X and/or the condition Y is the merchandise item corresponding to the object in a frame image on a one-to-one basis. The similarity determining unit 94 determines that the available merchandise items satisfying the condition Z are not determined merchandise items but candidates for the merchandise item captured by the camera 27. By extracting the available merchandise item satisfying the condition Z from the available merchandise items recorded in the feature amount file 361, the similarity determining unit 94 extracts candidates for the available merchandise item corresponding to the imaged merchandise item.

As long as the conditions X through Z are set stepwise in accordance with degrees of similarity, the conditions X through Z are not particularly limited. For example, the conditions X through Z may be set in conjunction with predetermined threshold values. A case where the conditions X through Z are set in conjunction with threshold values Tx through Tz is described herein. The threshold values Tx through Tz are in descending order.

The similarity determining unit 94 counts the number of times the degree of similarity to an available merchandise item becomes equal to or higher than the predetermined threshold value Tx, and, if the number of times becomes equal to or larger than a predetermined number of times, determines that the condition X is satisfied.

If the degree of similarity to the available merchandise item is lower than the threshold value Tx, and is equal to or higher than the threshold value Ty, the similarity determining unit 94 determines that the condition Y is satisfied. The similarity determining unit 94 then determines that the available merchandise item satisfying the condition Y is a determined merchandise item but requires a confirming operation by the operator.

If the degree of similarity to the available merchandise item is lower than the threshold value Ty, and is equal to or higher than the threshold value Tz, the similarity determining unit 94 determines that the condition Z is satisfied.

The respective conditions X through Z can be set in accordance with degrees of similarity, and are not limited to the above described example.

The determination notifying unit 95 notifies the operator or the customer, through an image output or a sound output, that the merchandise item captured by the camera 27 is uniquely determined to be an available merchandise item satisfying the condition X and/or the condition Y.

More specifically, the determination notifying unit 95 causes the display 221 to display a determination screen indicating that the available merchandise item satisfying the condition X is uniquely determined to be the merchandise item captured by the camera 27 (or to be the determined merchandise item), and outputs information about the determined merchandise item to the speaker 28. The speaker 28 outputs the input information, to notify the operator or the customer of the information indicating the determined merchandise item.

The determination notifying unit 95 also causes the display 221 to display a confirmation screen that receives a final confirming operation indicating whether the available merchandise item satisfying the condition Y (the determined merchandise item) is the merchandise item captured by the camera 27.

The determination notifying unit 95 outputs the information about the determined merchandise item to the speaker 28 by voice when the confirmation screen is displayed.

The candidate merchandise item presenting unit 96 causes the display 221 to display the information about the available merchandise items satisfying the condition Z as candidate merchandise items. More specifically, the candidate merchandise item presenting unit 96 reads the photographed images and the trade names of the available merchandise items satisfying the condition Z from the feature amount file 361, and sequentially outputs the photographed images and the trade names to the display 221 in descending order of similarity calculated by the similarity calculating unit 93. The display 221 displays the photographed images and the trade names of the candidate merchandise items in descending order of similarity.

In a case where a selecting operation on these candidate merchandise items is not to be accepted even though the photographed images of the candidate merchandise items are displayed on the display 221, the image acquiring process by the image acquiring unit 90, the object detecting process by the object detecting unit 91, and the similarity calculating process by the similarity calculating unit 93 are continued.

The input acquiring unit 97 accepts various input operations corresponding to the information displayed on the display 221 via the touch panel 222 or the keyboard 23. For example, the input acquiring unit 97 accepts an input operation indicating final confirmation that the merchandise item corresponding to a displayed photographed image is the determined merchandise item (this input operation is also the confirming operation). In a case where the input acquiring unit 97 has accepted a confirming operation, the determination notifying unit 95 causes the display 221 to display the determination screen.

The input acquiring unit 97 accepts a selecting operation on one photographed image among the photographed images of the candidate merchandise items displayed on the display 221. The input acquiring unit 97 accepts the available merchandise item in the selected photographed image as the determined merchandise item corresponding to the merchandise item. In a case where the object detecting unit 91 is capable of detecting two or more merchandise items, the input acquiring unit 97 may accept a selecting operation on two or more candidate merchandise items among the candidate merchandise items. In a case where the input acquiring unit 97 has accepted a selecting operation, the determination notifying unit 95 causes the display 221 to display the determination screen indicating the accepted candidate merchandise item as the determined merchandise item.

The information outputting unit 98 outputs information about the merchandise item determined in the above described manner (the information being the merchandise item ID, the trade name, or discount information, for example) to the POS terminal 3 via the interface 25.

The information outputting unit 98 may output the number of unit sales independently input via the touch panel 222 or the keyboard 23, as well as the merchandise item ID or the like, to the POS terminal 3. As the information to be output from the information outputting unit 98 to the POS terminal 3, the merchandise item ID read by the information outputting unit 98 from the feature amount file 361 may be reported directly to the POS terminal 3, or the trade name with which the merchandise item ID can be identified, a merchandise item image, or the file name of a photographed image may be reported to the POS terminal 3.

The sales registering unit 991 of the POS terminal 3 registers the sales of the corresponding merchandise item based on the merchandise item ID and the number of unit sales that have been output from the information outputting unit 98. Specifically, the sales registering unit 991 refers to the feature amount file 361, and performs sales registration (provisional registration) by recording the reported merchandise item ID, the corresponding merchandise classification, the trade name, the unit price, and the number of unit sales into the sales master file or the like.

The sales canceling unit 992 of the POS terminal 3 cancels the sales registration of the corresponding merchandise item based on the merchandise item ID and the number of unit sales that have been output from the information outputting unit 98. Specifically, the sales canceling unit 992 refers to the feature amount file 361, and retrieves the reported merchandise item ID, the corresponding merchandise classification, the trade name, the unit price, and the number of unit sales from the sales master file or the like. The sales canceling unit 992 then deletes the retrieved merchandise item ID and the corresponding merchandise classification, the trade name, the unit price, and the number of unit sales. Accordingly, the sales canceling unit 992 can cancel sales registration (provisional registration) in one transaction, and can also handle a returned item after a transaction (payment).

Figure 4:
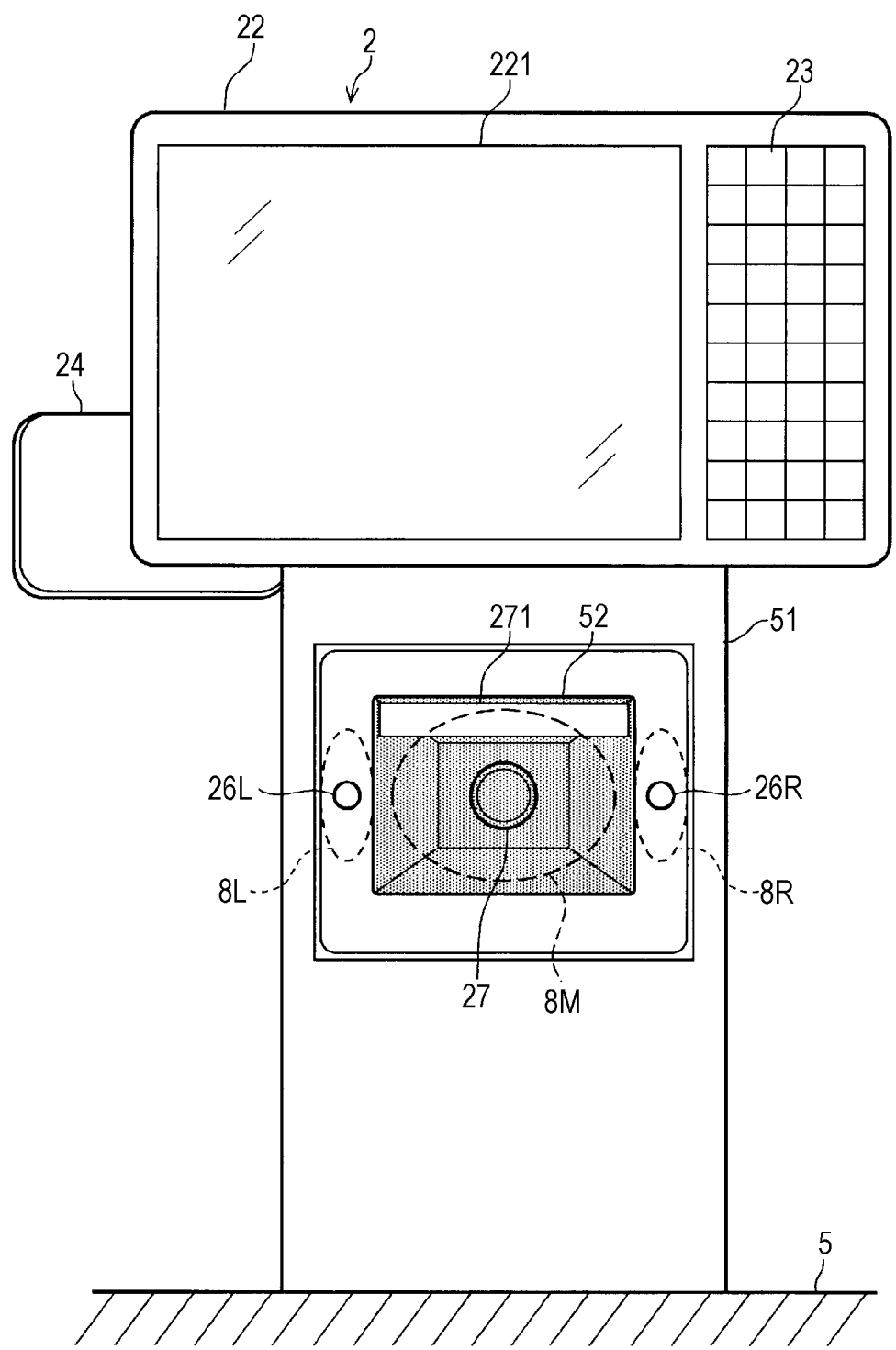
FIG. 4 is a front view of a merchandise item identification device according to the first embodiment.

FIG. 4 is a front view of the merchandise item identification device 2 according to the first embodiment.

The merchandise item identification device 2 is installed on the counter table 5. The merchandise item identification device 2 includes the thin, rectangular housing 51, the display/operation unit 22 attached to the upper portion of the housing 51, and the customer display 24 installed behind and on the left side of the display/operation unit 22, with the front side of the display/operation unit 22 facing backward.

The read window 52 is formed in the front surface of the housing 51.

A light 271 and the camera 27 (the imaging unit) are placed behind the read window 52. A recognition area 8M is the area in which the camera 27 captures an image of an object, this object is sensed, and a merchandise item is identified.

The left photoelectric sensor 26L (the first sensing unit) is provided on the left side of the read window 52. The right photoelectric sensor 26R (the second sensing unit) is provided on the right side of the read window 52. An area 8L (the first area) is located on one side of the recognition area 8M, and is the area in which the left photoelectric sensor 26L senses an object. An area 8R (the second area) is located on the other side of the recognition area 8M, and is the area in which the right photoelectric sensor 26R senses an object.

The left photoelectric sensor 26L (the first sensing unit) senses the existence of an object in the area 8L located on the one side of the merchandise item recognition area 8M. The left photoelectric sensor 26L senses the existence of an object in a predetermined range of depth.

The right photoelectric sensor 26R (the second sensing unit) senses the existence of an object in the area 8R located on the other side of the recognition area 8M. The right photoelectric sensor 26R senses the existence of an object in a predetermined range of depth. It should be noted that the left photoelectric sensor 26L may be the second sensing unit, and the right photoelectric sensor 26R may be the first sensing unit.

When the operator takes out a merchandise item from the first shopping basket 4L and holds the merchandise item in front of the read window 52, the operator can cause the left photoelectric sensor 26L to sense the merchandise item through an intuitive and natural operation. When the operator transfers the merchandise item recognized by the merchandise item identification device 2 into the second shopping basket 4R, the operator can cause the right photoelectric sensor 26R to sense the merchandise item through an intuitive and natural operation.

The merchandise item identification device 2 causes the POS terminal 3 to perform a merchandise item registration process or a merchandise item registration cancellation process, in accordance with the temporal sequence of results of object sensing performed by the left photoelectric sensor 26L, the right photoelectric sensor 26R, and the camera 27.

Figure 5A:
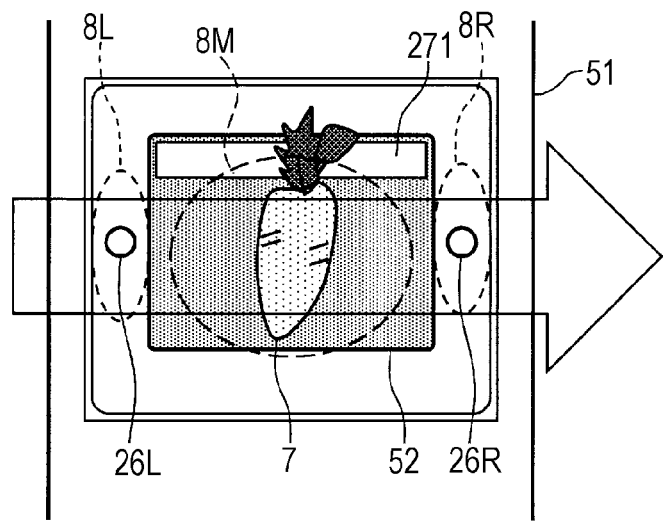
FIGS. 5A and 5B are diagrams for explaining a merchandise item registering operation and a merchandise item registration canceling operation according to the first embodiment.
Figure 5B:
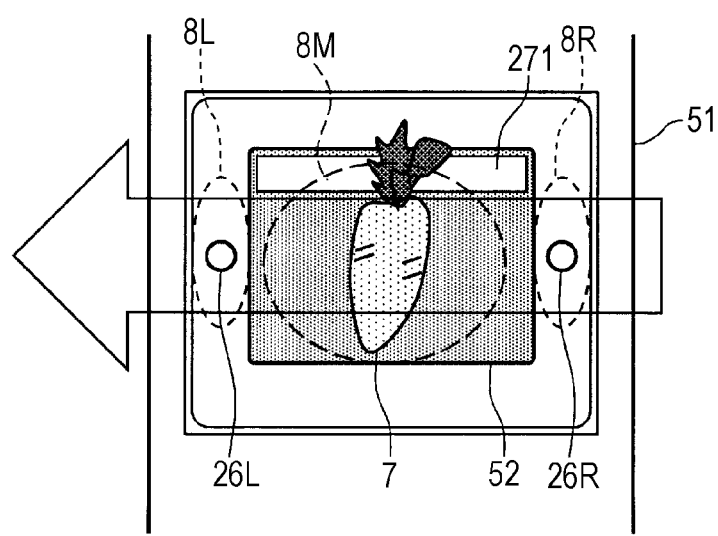

FIGS. 5A and 5B are diagrams for explaining a merchandise item registering operation and a merchandise item registration canceling operation according to the first embodiment.

FIG. 5A is a diagram for explaining a merchandise item registering operation.

Prior to a merchandise item registering operation, the operator takes out a merchandise item from the first shopping basket 4L, and holds the merchandise item in front of the camera 27 through the read window 52. After that, the operator puts the merchandise item into the second shopping basket 4R. This operation is the same as an operation of a conventional merchandise item registration apparatus, and is an intuitive and natural operation.

In this operation, after the left photoelectric sensor 26L senses an object, the merchandise item identification device 2 senses the object from the image captured by the camera 27 and identifies the merchandise item. Since the left photoelectric sensor 26L senses the object immediately before the merchandise item is identified, the merchandise item identification device 2 provisionally registers the merchandise item.

In this manner, the merchandise item identification device 2 can specify the merchandise item registering operation in accordance with the temporal sequence of a result of the sensing performed by the right photoelectric sensor 26R, a result of the object sensing from the image captured by the camera 27, and a result of the sensing performed by the left photoelectric sensor 26L.

FIG. 5B is a diagram for explaining a merchandise item registration canceling operation.

Prior to a merchandise item registration canceling operation, the operator takes out a merchandise item from the second shopping basket 4R, and holds the merchandise item in front of the camera 27 through the read window 52. After that, the operator returns the merchandise item into the first shopping basket 4L. This operation is performed in the reverse order of the merchandise item registering operation, and is an intuitive and natural operation.

In this operation, after the right photoelectric sensor 26R senses an object, the merchandise item identification device 2 senses the object from the image captured by the camera 27 and identifies the merchandise item. Since the right photoelectric sensor 26R senses the object immediately before the merchandise item is identified, the merchandise item identification device 2 cancels the registration of the merchandise item.

In this manner, the merchandise item identification device 2 can specify the merchandise item registration canceling operation in accordance with the temporal sequence of a result of the sensing performed by the right photoelectric sensor 26R, a result of the object sensing from the image captured by the camera 27, and a result of the sensing performed by the left photoelectric sensor 26L.

In accordance with the merchandise item identified by the camera 27 and the direction of object transfer detected by the photoelectric sensors, the merchandise item identification device 2 may distinguish and specify a merchandise item registering operation or a merchandise item registration correcting operation, and switch between a merchandise item registration process and a merchandise item registration cancellation process.

FIG. 6 is a flowchart showing a merchandise item registration process according to the first embodiment.

The merchandise item registration process according to the first embodiment is a series of procedures that start when an operator (a store clerk) takes out a merchandise item from the first shopping basket 4L (see FIG. 1) and holds the merchandise item in front of the camera 27 through the read window 52, and end when the operator puts the merchandise item into the second shopping basket 4R, for example.

In step S10, the CPU 211 of the merchandise item identification device 2 determines whether the left photoelectric sensor 26L has been switched on. If the CPU 211 determines that the left photoelectric sensor 26L has not been switched on (No), the process returns to step S10. If the CPU 211 determines that the left photoelectric sensor 26L has been switched on (Yes), the process moves on to step S11. Specifically, the left photoelectric sensor 26L having been switched on means that an object has been sensed in the area 8L located on one side of the recognition area 8M, and the operator is about to hold a merchandise item taken out from the first shopping basket 4L, in front of the camera 27 through the read window 52.

In step S11, the image acquiring unit 90 outputs an imaging on-state signal to the camera 27, so that the camera 27 starts capturing (imaging) a merchandise item image. The image acquiring unit 90 acquires the frame image (captured image) that has been captured by the camera 27 and been stored into the RAM 213.

In step S12, the object detecting unit 91 performs an object recognition process on the frame image acquired by the image acquiring unit 90, and tries to recognize (detect) all or part of the object that is the merchandise item.

In step S13, a check is made to determine whether the object detecting unit 91 has successfully recognized all or part of the object that is the merchandise item. If the object detecting unit 91 has successfully recognized the object that is the merchandise item (Yes), the process moves on to step S14. If the object detecting unit 91 has not successfully recognized the object that is the merchandise item (No), the process returns to step S11. To be specific, steps S11 through S13 are a series of procedures in which the operator holds a merchandise item in front of the camera 27 through the read window 52, and the merchandise item identification device 2 successfully detects the object that is the merchandise item.

In step S14, the similarity calculating unit 93 reads a feature amount of the merchandise item from the image showing all or part of the merchandise item. The similarity determining unit 94 further determines whether the feature amount file 361 contains an available merchandise item having a degree of similarity equal to or higher than a predetermined threshold value, and retrieves the trade name and the unit price of the merchandise item. As a result, the merchandise item identification device 2 can determine the merchandise item.

In step S15, the information outputting unit 98 outputs the merchandise item ID and the like of the determined available merchandise item to the POS terminal 3, and causes the POS terminal 3 to conduct provisional registration. The sales registering unit 991 of the POS terminal 3 provisionally registers the merchandise item based on the merchandise item ID. At this point, the determination notifying unit 95 causes the display 221 to display a determination screen including a photographed image of the determined merchandise item, and notifies the trade name of the determined merchandise item by voice. When the procedure in step S15 is completed, the process shown in FIG. 6 comes to an end.

Through this merchandise item registration process, the operator can register a merchandise item, without any keyboard operation. Also, as the merchandise item identification device 2 performs determination based on results of sensing of an object in the respective areas, false detection occurs less frequently than in a case where object recognition is performed with an image, and stable operation can be realized.

Figure 7:
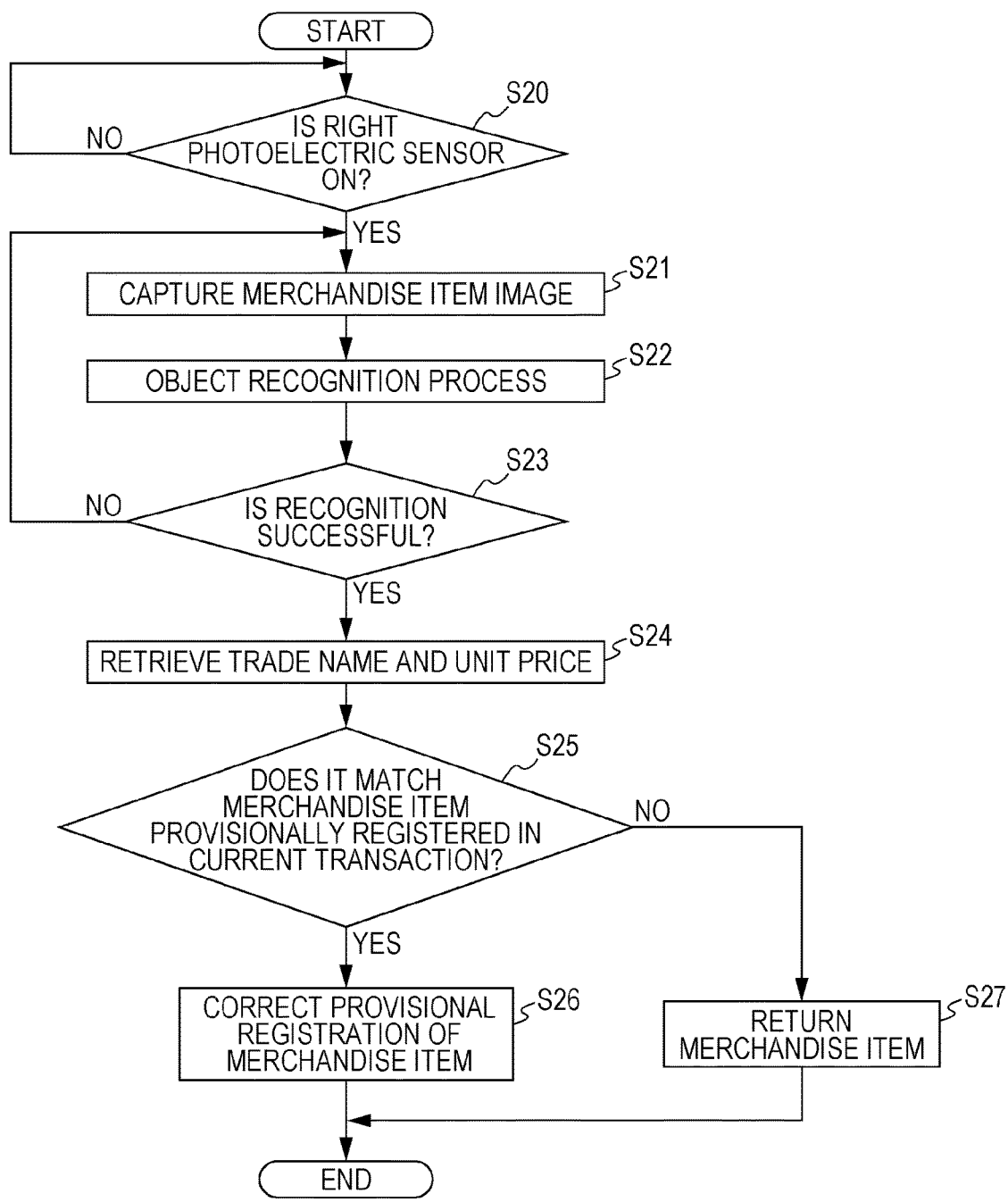
FIG. 7 is a flowchart showing a merchandise item registration cancellation process according to the first embodiment.

FIG. 7 is a flowchart showing a merchandise item registration cancellation process according to the first embodiment.

The merchandise item registration cancellation process according to the first embodiment is a series of procedures that start when an operator (a store clerk) takes out a provisionally-registered merchandise item from the second shopping basket 4R (see FIG. 1) and holds the merchandise item in front of the camera 27 through the read window 52, and end when the operator returns the merchandise item into the first shopping basket 4L, for example. The merchandise item registration cancellation process is also a process in which an operator holds a paid merchandise item in front of the camera 27 through the read window 52, and handles the merchandise item as a returned item.

In step S20, the CPU 211 of the merchandise item identification device 2 determines whether the right photoelectric sensor 26R has been switched on. If the CPU 211 determines that the right photoelectric sensor 26R has not been switched on (No), the process returns to step S20. If the CPU 211 determines that the right photoelectric sensor 26R has been switched on (Yes), the process moves on to step S21. Specifically, the right photoelectric sensor 26R having been switched on means that an object has been sensed in the area 8R located on the other side of the recognition area 8M (see FIG. 4), and the operator is about to hold a merchandise item taken out from the second shopping basket 4R, in front of the camera 27 through the read window 52.

In step S21, the image acquiring unit 90 outputs an imaging on-state signal to the camera 27, so that the camera 27 starts capturing (imaging) a merchandise item image. The image acquiring unit 90 acquires the frame image (captured image) that has been captured by the camera 27 and been stored into the RAM 213.

In step S22, the object detecting unit 91 performs an object recognition process on the frame image acquired by the image acquiring unit 90, and tries to recognize (detect) all or part of the object that is the merchandise item.

In step S23, a check is made to determine whether the object detecting unit 91 has successfully recognized all or part of the object that is the merchandise item. If the object detecting unit 91 has successfully recognized the object that is the merchandise item (Yes), the process moves on to step S24. If the object detecting unit 91 has not successfully recognized the object that is the merchandise item (No), the process returns to step S21. To be specific, steps S21 through S23 are a series of procedures in which the operator holds a merchandise item in front of the camera 27 through the read window 52, and the merchandise item identification device 2 successfully detects the object that is the merchandise item.

In step S24, the similarity calculating unit 93 reads a feature amount of the merchandise item from the image showing all or part of the merchandise item. The similarity determining unit 94 further determines whether the feature amount file 361 contains an available merchandise item having a degree of similarity equal to or higher than a predetermined threshold value, and retrieves the trade name and the unit price of the merchandise item. As a result, the merchandise item identification device 2 can determine the merchandise item.

In step S25, the determination notifying unit 95 determines whether the determined merchandise item matches a merchandise item provisionally registered in the current transaction. If the determination notifying unit 95 determines that the determined merchandise item matches a merchandise item provisionally registered in the current transaction (Yes), the process moves on to step S26. If the determination notifying unit 95 determines that the determined merchandise item does not match any merchandise item provisionally registered in the current transaction (No), the process moves on to step S27.

In step S26, the information outputting unit 98 outputs the merchandise item ID and the like of the determined available merchandise item to the POS terminal 3, and causes the POS terminal 3 to correct the provisional registration of the merchandise item. The sales canceling unit 992 of the POS terminal 3 corrects (cancels) the provisional registration of the merchandise item based on the merchandise item ID. At this point, the determination notifying unit 95 causes the display 221 to display a screen including a photographed image of the determined merchandise item, and notifies the trade name of the determined merchandise item and cancellation of the provisional registration of the determined merchandise item by voice. When the procedure in step S26 is completed, the process shown in FIG. 7 comes to an end.

In step S27, the information outputting unit 98 outputs the merchandise item ID and the like of the determined available merchandise item to the POS terminal 3, and causes the POS terminal 3 to perform a merchandise item return process. The sales canceling unit 992 of the POS terminal 3 performs the merchandise item return process based on the merchandise item ID. At this point, the determination notifying unit 95 causes the display 221 to display a screen including a photographed image of the determined merchandise item, and notifies the trade name of the determined merchandise item and the returning of the determined merchandise item by voice. When the procedure in step S27 is completed, the process shown in FIG. 7 comes to an end.

Through this merchandise item registration cancellation process, the operator can cancel merchandise item registration, without any keyboard operation. Also, as the merchandise item identification device 2 performs determination based on results of sensing of an object in the respective areas, false detection occurs less frequently than in a case where object recognition is performed with an image, and stable operation can be realized.

Figure 8:
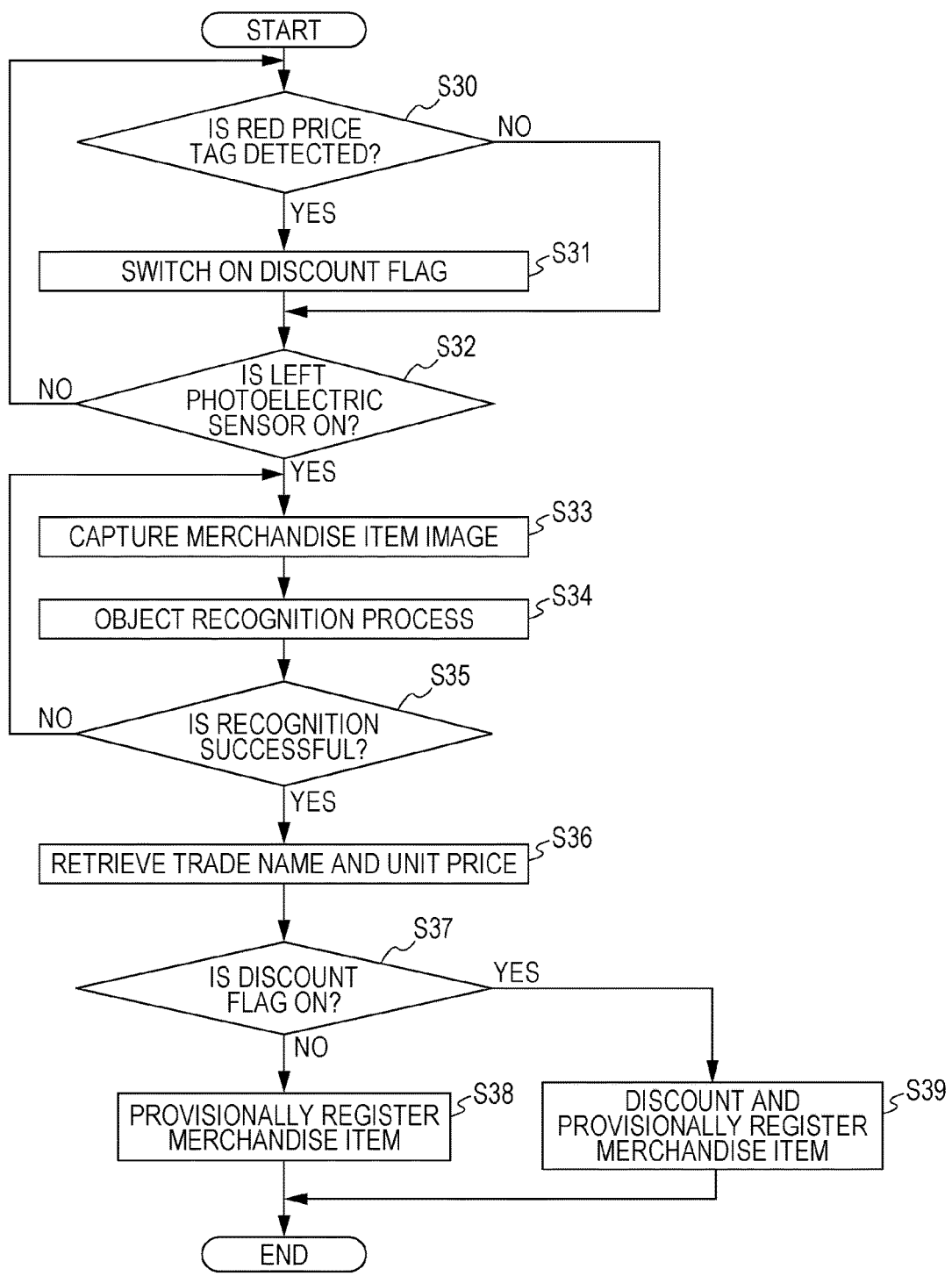
FIG. 8 is a flowchart showing a merchandise item registration process according to a first modification of the first embodiment.

FIG. 8 is a flowchart showing a merchandise item registration process according to a first modification of the first embodiment.

The merchandise item registration process according to the first modification of the first embodiment is a series of procedures in which an operator holds a merchandise item taken out from the first shopping basket 4L (see FIG. 1) in front of the camera 27 through the read window 52, and transfers the merchandise item into the second shopping basket 4R, for example. If a red price tag has been attached to the merchandise item at this point, a discount process is automatically performed.

In step S30, the CPU 211 of the merchandise item identification device 2 determines whether the left photoelectric sensor 26L has detected a red price tag attached to a merchandise item. If the left photoelectric sensor 26L has detected the red color, the CPU 211 determines that a red price tag has been detected. If the CPU 211 determines that the left photoelectric sensor 26L has detected a red price tag (Yes), the process moves on to step S31. If the CPU 211 determines that the left photoelectric sensor 26L has not detected a red price tag (No), the process moves on to step S32.

In step S31, the CPU 211 of the merchandise item identification device 2 switches on a discount flag. At this point, a red price tag has been attached to the merchandise item, and the merchandise item is to be discounted.

In step S32, the CPU 211 of the merchandise item identification device 2 determines whether the left photoelectric sensor 26L has been switched on. If the CPU 211 determines that the left photoelectric sensor 26L has not been switched on (No), the process returns to step S30. If the CPU 211 determines that the left photoelectric sensor 26L has been switched on (Yes), the process moves on to step S33. Specifically, the left photoelectric sensor 26L having been switched on means that an object has been sensed in the area 8L located on one side of the recognition area 8M, and the operator is about to hold a merchandise item taken out from the first shopping basket 4L, in front of the camera 27 through the read window 52.

The procedures in steps S33 through S36 are the same as the procedures in steps S11 through S14 shown in FIG. 6.

In step S37, the CPU 211 of the merchandise item identification device 2 determines whether the discount flag is on. If the CPU 211 determines that the discount flag is not on (No), the process moves on to step S38. If the CPU 211 determines that the discount flag is on (Yes), the process moves on to step S39.

In step S38, the information outputting unit 98 outputs the merchandise item ID and the like of the determined available merchandise item to the POS terminal 3, and causes the POS terminal 3 to conduct provisional registration. The sales registering unit 991 of the POS terminal 3 provisionally registers the merchandise item based on the merchandise item ID. At this point, the determination notifying unit 95 causes the display 221 to display a determination screen including a photographed image of the determined merchandise item, and notifies the trade name of the determined merchandise item by voice. When the procedure in step S38 is completed, the process shown in FIG. 8 comes to an end.

In step S39, the information outputting unit 98 outputs the merchandise item ID and the like of the determined available merchandise item, together with discount information, to the POS terminal 3, and causes the POS terminal 3 to conduct provisional registration. The sales registering unit 991 of the POS terminal 3 discounts and provisionally registers the merchandise item based on the merchandise item ID. At this point, the determination notifying unit 95 causes the display 221 to display a determination screen including a photographed image of the determined merchandise item, and notifies the trade name of the determined merchandise item and the discount by voice. When the procedure in step S39 is completed, the process shown in FIG. 8 comes to an end.

As described above, the left photoelectric sensor 26L can sense a color as well as an object. As a discount sticker or the like attached to a merchandise item is in a characteristic color, the merchandise item identification device 2 can sense the color, and perform a discount process or the like accompanying a merchandise item registration process, without any keyboard operation.

Figure 9:
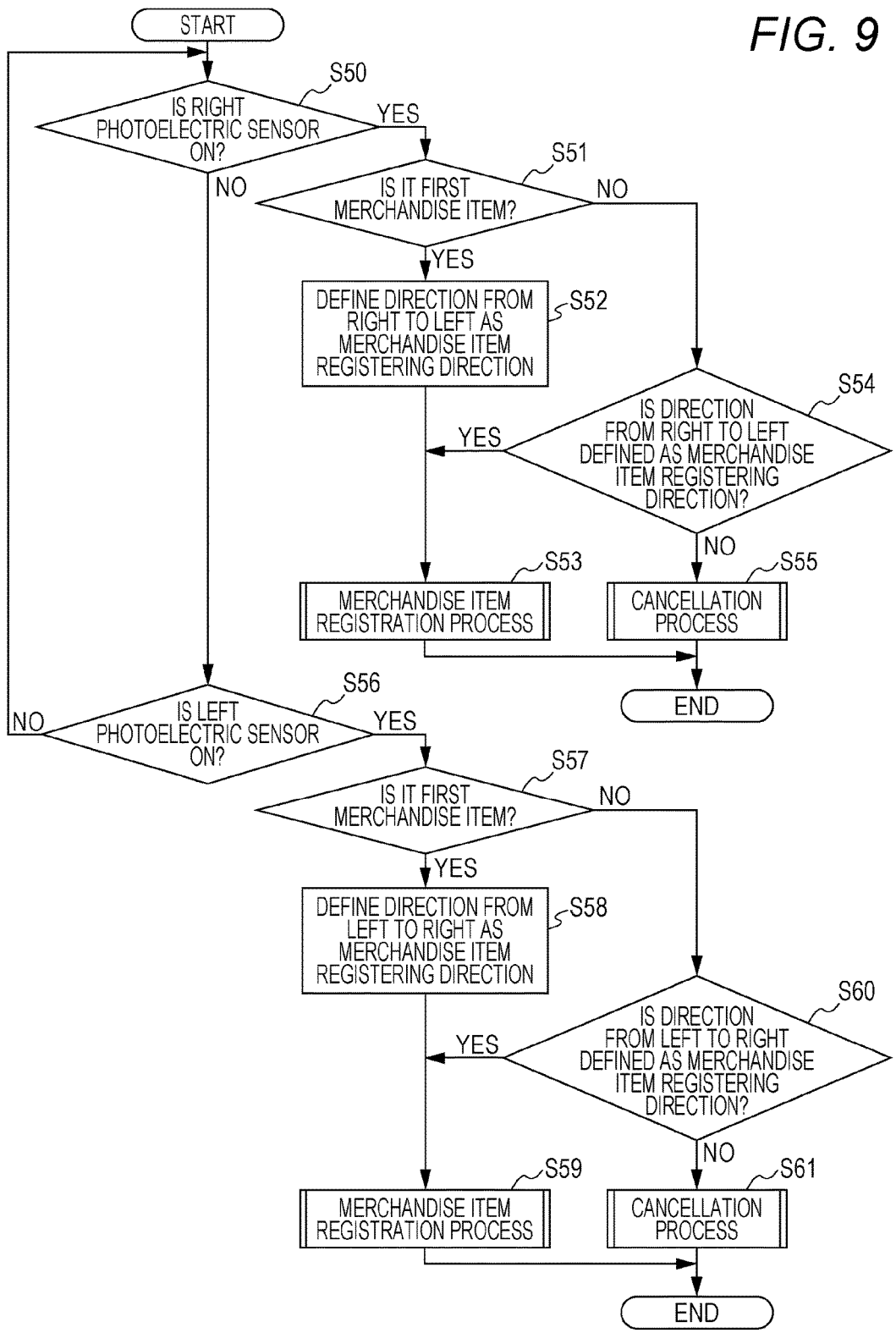
FIG. 9 is a flowchart showing a merchandise item registering direction determination process according to a second modification of the first embodiment.

FIG. 9 is a flowchart showing a merchandise item registering direction determination process according to a second modification of the first embodiment.

While walking from right to left in FIG. 1, a customer might go through a merchandise item registration process. That is, the unsettled shopping basket 4 is placed on the right side, and the shopping basket 4 for provisionally-registered merchandise items or sales-registered merchandise items is placed on the left side. To realize this, it is necessary to determine whether the first merchandise item in each transaction has been sensed by the left photoelectric sensor 26L, or by the right photoelectric sensor 26R.

In step S50, the CPU 211 of the merchandise item identification device 2 determines whether the right photoelectric sensor 26R has been switched on. If the CPU 211 determines that the right photoelectric sensor 26R has not been switched on (No), the process moves on to step S56. If the CPU 211 determines that the right photoelectric sensor 26R has been switched on (Yes), the process moves on to step S51.

In step S51, the CPU 211 determines whether the merchandise item is the first merchandise item in this transaction. If the CPU 211 determines that the merchandise item is the first merchandise item in the current transaction (Yes), the process moves on to step S52. If the CPU 211 determines that the merchandise item is not the first merchandise item in the current transaction (No), the process moves on to step S54.

In step S52, the CPU 211 defines the direction from right to left as the merchandise item registering direction. Thereafter, in this transaction, each merchandise item recognized in a frame image through object recognition after the right photoelectric sensor 26R is first switched on is subjected to a merchandise item registration process.

In step S53, the CPU 211 performs a merchandise item registration process on this merchandise item. A merchandise item registration process is the process shown in steps S11 through S15 in FIG. 6, for example, and is a process of provisionally registering this merchandise item in the current transaction. When the CPU 211 completes the merchandise item registration process in step S53, the process shown in FIG. 9 comes to an end.

In step S54, the CPU 211 determines whether the merchandise item registering direction has been defined as the direction from right to left. If the CPU 211 determines that the merchandise item registering direction is defined as the direction from right to left (Yes), the process moves on to step S53. If the CPU 211 determines that the merchandise item registering direction has not been defined as the direction from right to left (No), the process moves on to step S55.

In step S55, the CPU 211 performs a cancellation process on this merchandise item. A cancellation process is the process shown in steps S21 through S26 or S27 in FIG. 7, for example, and, if this merchandise item matches a provisionally-registered merchandise item, the provisional registration of the merchandise item is canceled through the cancellation process in the current transaction. When the CPU 211 completes the cancellation process in step S55, the process shown in FIG. 9 comes to an end.

In step S56, the CPU 211 of the merchandise item identification device 2 determines whether the left photoelectric sensor 26L has been switched on. If the CPU 211 determines that the left photoelectric sensor 26L has not been switched on (No), the process returns to step S50. If the CPU 211 determines that the left photoelectric sensor 26L has been switched on (Yes), the process moves on to step S57.

In step S57, the CPU 211 determines whether the merchandise item is the first merchandise item in this transaction. If the CPU 211 determines that the merchandise item is the first merchandise item in the current transaction (Yes), the process moves on to step S58. If the CPU 211 determines that the merchandise item is not the first merchandise item in the current transaction (No), the process moves on to step S60.

In step S58, the CPU 211 defines the direction from left to right as the merchandise item registering direction. Thereafter, in this transaction, each merchandise item recognized in a frame image through object recognition after the left photoelectric sensor 26L is first switched on is subjected to a merchandise item registration process.

In step S59, the CPU 211 performs a merchandise item registration process on this merchandise item. A merchandise item registration process is the process shown in steps S11 through S15 in FIG. 6, for example, and is a process of provisionally registering this merchandise item in the current transaction. The merchandise item transfer direction at this point differs from the merchandise item transfer direction in step S53.

When the CPU 211 completes the merchandise item registration process in step S59, the process shown in FIG. 9 comes to an end.

In step S60, the CPU 211 determines whether the merchandise item registering direction has been defined as the direction from left to right. If the CPU 211 determines that the merchandise item registering direction is defined as the direction from left to right (Yes), the process moves on to step S59. If the CPU 211 determines that the merchandise item registering direction has not been defined as the direction from left to right (No), the process moves on to step S61.

In step S61, the CPU 211 performs a cancellation process on this merchandise item. A cancellation process is the process shown in steps S21 through S26 or S27 in FIG. 7, for example, and, if this merchandise item matches a provisionally-registered merchandise item, the provisional registration of the merchandise item is canceled through the cancellation process in the current transaction. The merchandise item transfer direction at this point differs from the merchandise item transfer direction in step S55. When the CPU 211 completes the cancellation process in step S61, the process shown in FIG. 9 comes to an end.

By performing the above process, the merchandise item identification device 2 can operate so as to perform a merchandise item registration process in the transfer direction of the first merchandise item in each transaction, and perform a merchandise item registration cancellation process in the opposite direction. Accordingly, layouts in the store can be set, regardless of the orientation of the merchandise item identification device 2.

Although the merchandise item registering direction is defined by the sensor that has sensed the first merchandise item in each transaction in steps S51 and S57, the merchandise item registering direction is not particularly limited, and may be the transfer direction of the first merchandise item after the merchandise item registration apparatus 1 is powered on, or the transfer direction of the first merchandise item at the time of the start of use of the merchandise item registration apparatus 1.

Second Embodiment

Figure 10:
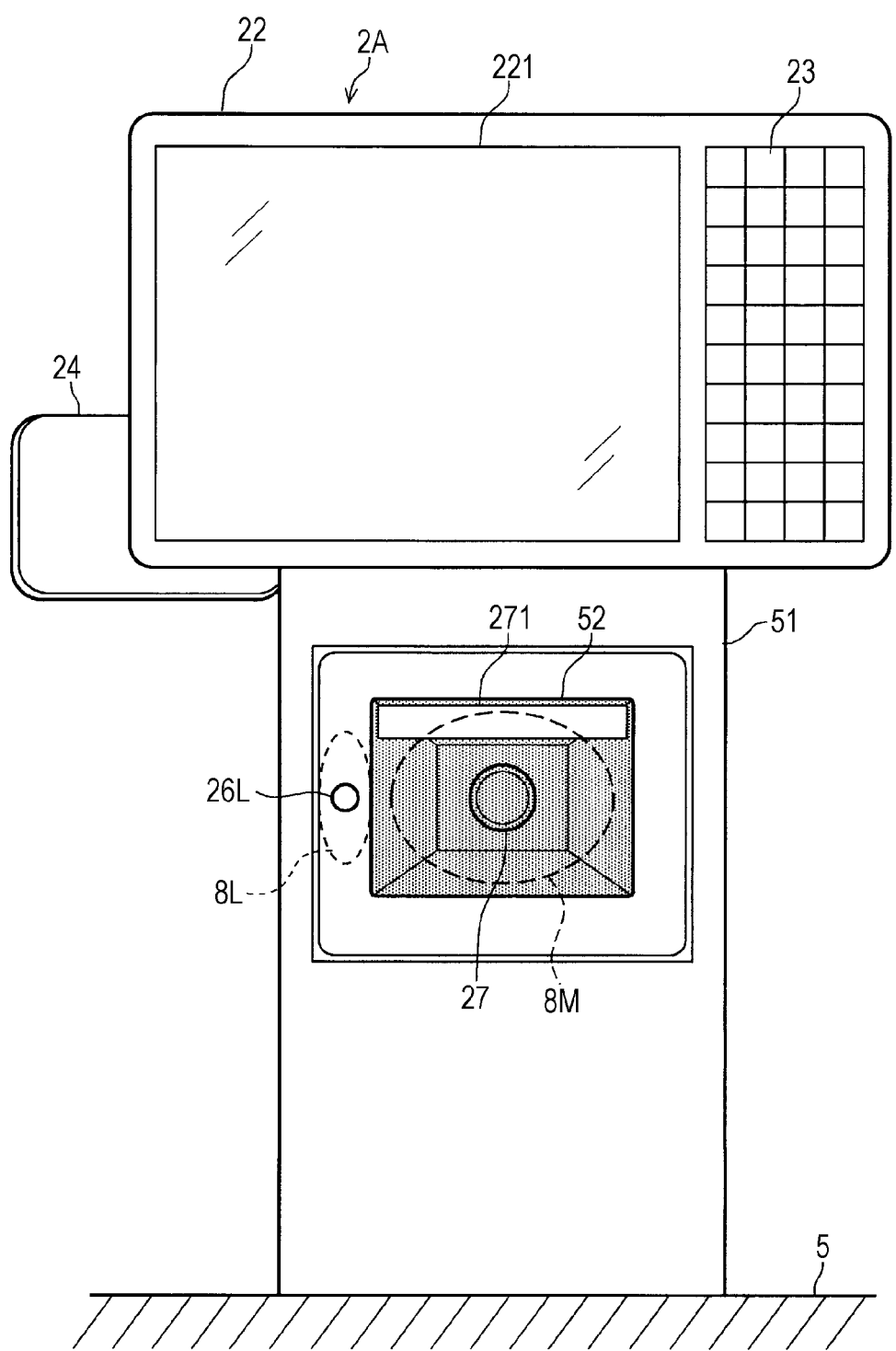
FIG. 10 is a front view of a merchandise item identification device according to a second embodiment.

FIG. 10 is a front view of a merchandise item identification device 2A according to a second embodiment. The same components as those of the merchandise item identification device 2 of the first embodiment shown in FIG. 4 are denoted by the same reference numerals used in the first embodiment.

The merchandise item identification device 2A of the second embodiment differs from the merchandise item identification device 2 of the first embodiment in not including the right photoelectric sensor 26R (the second sensing unit). Other than that, the merchandise item identification device 2A has the same structure as the merchandise item identification device 2 of the first embodiment.

A merchandise item registration process of the second embodiment is the same as that of the first embodiment. However, a merchandise item registration cancellation process of the second embodiment is a series of procedures that start when an operator (a store clerk) takes out a registered merchandise item from the second shopping basket 4R (see FIG. 1) and holds the merchandise item in front of the camera 27 through the read window 52, and end when the operator returns the merchandise item into the first shopping basket 4L after causing the left photoelectric sensor 26L to sense the merchandise item and canceling the registration of the merchandise item, for example.

Figure 11:
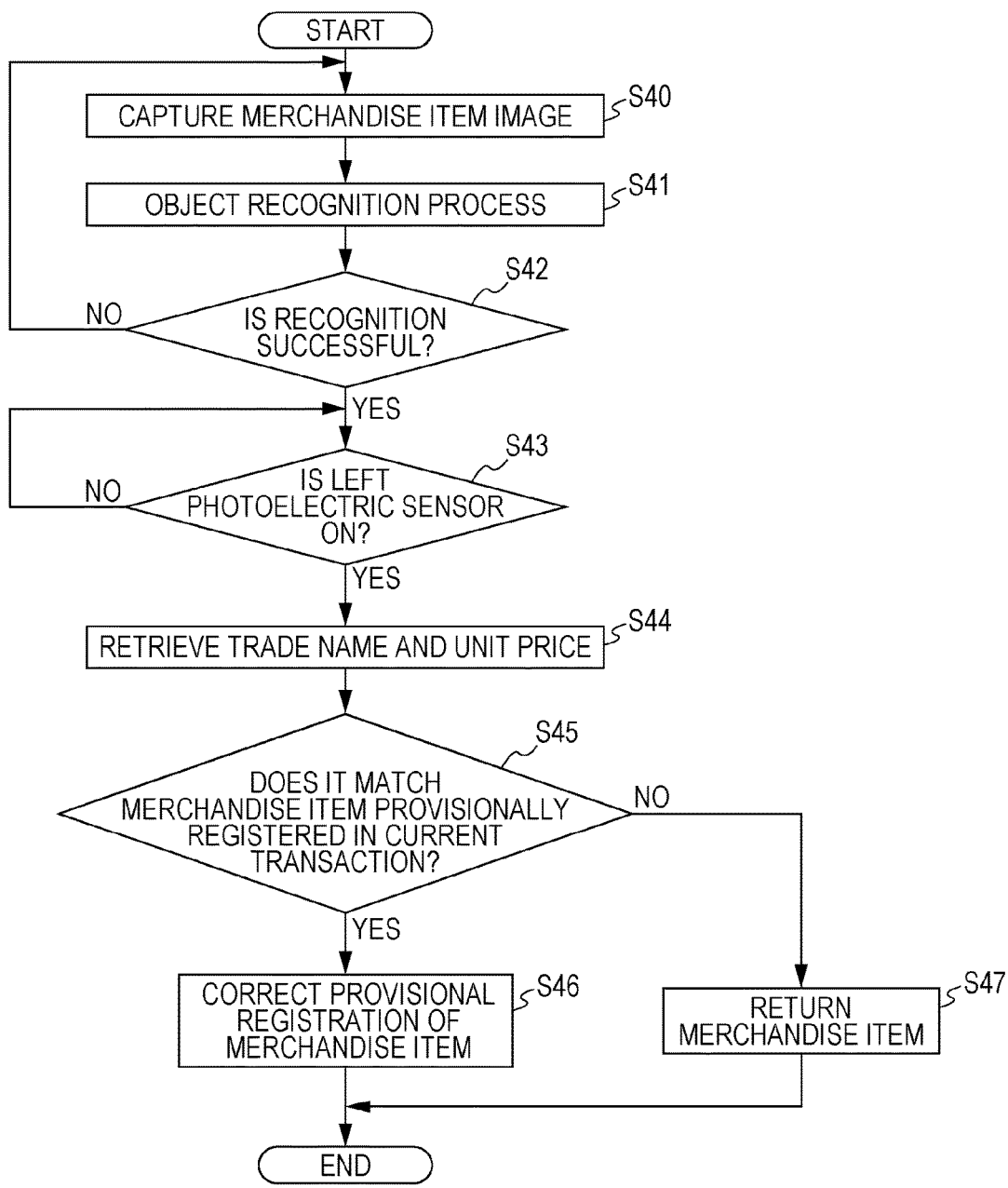
FIG. 11 is a flowchart showing a merchandise item registration cancellation process according to the second embodiment.

FIG. 11 is a flowchart showing a merchandise item registration cancellation process according to the second embodiment.

Like the procedures in steps S21 through S23 (see FIG. 7) of the first embodiment, the procedures in steps S40 through S42 are the procedures for capturing an image of a merchandise item and performing object recognition.

In step S43, the CPU 211 of the merchandise item identification device 2A determines whether the left photoelectric sensor 26L has been switched on. If the CPU 211 determines that the left photoelectric sensor 26L has not been switched on (No), the process returns to step S43. If the CPU 211 determines that the left photoelectric sensor 26L has been switched on (Yes), the process moves on to step S44. Specifically, the left photoelectric sensor 26L having been switched on means that an object has been sensed in the area 8L adjacent to the recognition area 8M (see FIG. 4), and the operator is about to return a merchandise item into the first shopping basket 4L after taking out the merchandise item from the second shopping basket 4R and holding the merchandise item in front of the camera 27 through the read window 52.

In step S44, the similarity calculating unit 93 reads a feature amount of the merchandise item from an image showing all or part of the merchandise item. The similarity determining unit 94 further determines whether the feature amount file 361 contains an available merchandise item having a degree of similarity equal to or higher than a predetermined threshold value, and retrieves the trade name and the unit price of the merchandise item. As a result, the merchandise item identification device 2 can determine the merchandise item.

In step S45, the determination notifying unit 95 determines whether the determined merchandise item matches a merchandise item provisionally registered in the current transaction. If the determination notifying unit 95 determines that the determined merchandise item matches a merchandise item provisionally registered in the current transaction (Yes), the process moves on to step S46. If the determination notifying unit 95 determines that the determined merchandise item does not match any merchandise item provisionally registered in the current transaction (No), the process moves on to step S47.

In step S46, the information outputting unit 98 outputs the merchandise item ID and the like of the determined available merchandise item to the POS terminal 3, and causes the POS terminal 3 to correct the provisional registration of the merchandise item. The sales canceling unit 992 of the POS terminal 3 corrects (cancels) the provisional registration of the merchandise item based on the merchandise item ID. At this point, the determination notifying unit 95 causes the display 221 to display a screen including a photographed image of the determined merchandise item, and notifies the trade name of the determined merchandise item and cancellation of the provisional registration of the determined merchandise item by voice. When the procedure in step S46 is completed, the process shown in FIG. 11 comes to an end.

In step S47, the information outputting unit 98 outputs the merchandise item ID and the like of the determined available merchandise item to the POS terminal 3, and causes the POS terminal 3 to perform a merchandise item return process. The sales canceling unit 992 of the POS terminal 3 performs a return process on (cancels) the merchandise item based on the merchandise item ID. At this point, the determination notifying unit 95 causes the display 221 to display a screen including a photographed image of the determined merchandise item, and notifies the trade name of the determined merchandise item and the return process being performed on the determined merchandise item by voice. When the procedure in step S47 is completed, the process shown in FIG. 11 comes to an end. The merchandise item cancellation process in this example is a process of canceling the transaction related to a merchandise item that has been provisionally registered, and then been registered and paid for.

As described above, even where two photoelectric sensors are not provided but only one photoelectric sensor is provided on one side, an operator can register merchandise items without any keyboard operation, and cancel the registration of the merchandise items.

Third Embodiment

Figure 12:
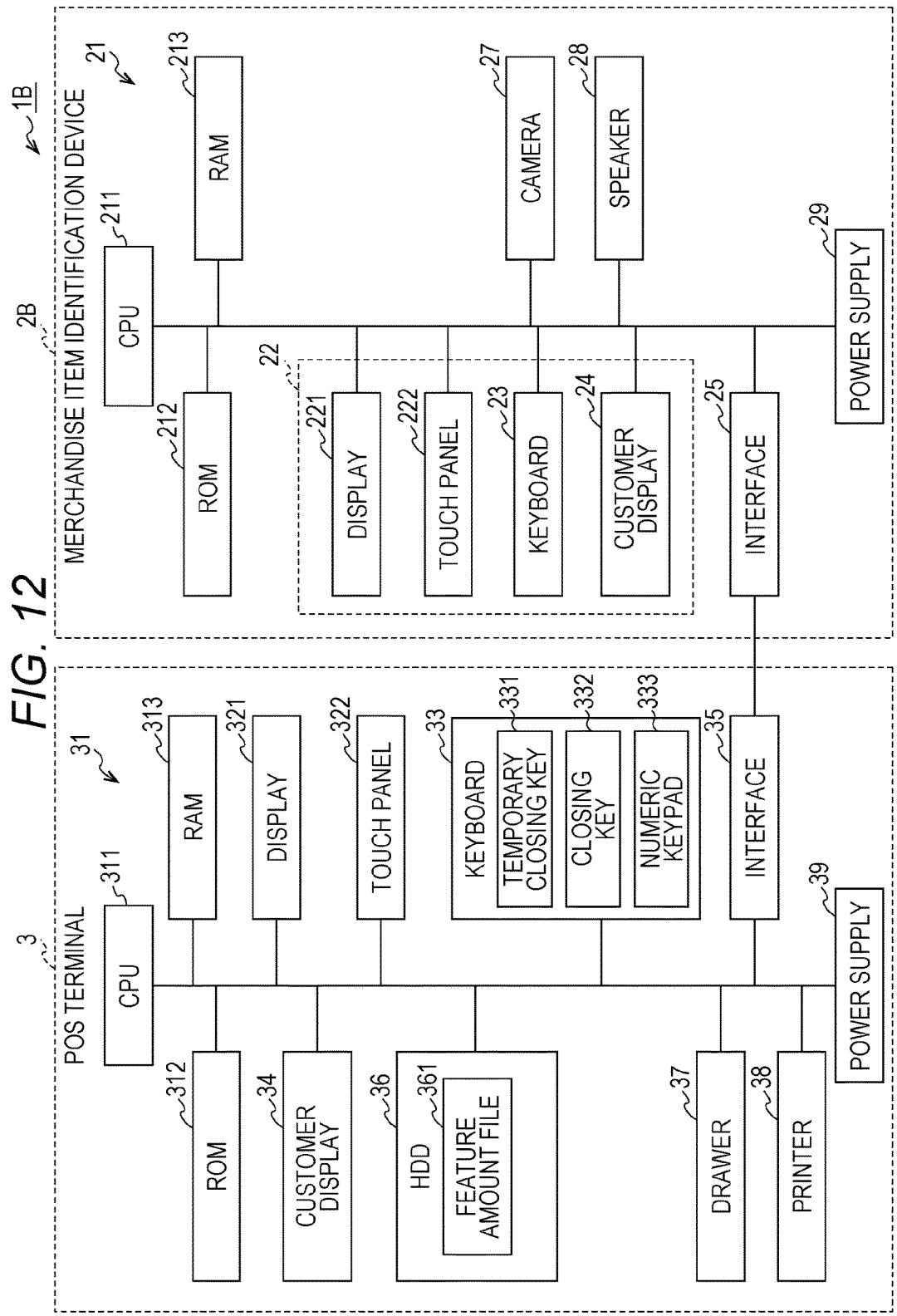
FIG. 12 is a diagram schematically showing the structure of a merchandise item registration apparatus according to a third embodiment.

FIG. 12 is a diagram schematically showing the structure of a merchandise item registration apparatus 1B according to a third embodiment. The same components as those of the merchandise item registration apparatus 1 of the first embodiment shown in FIG. 2 are denoted by the same reference numerals used in the first embodiment.

The merchandise item registration apparatus 1B of the third embodiment includes a merchandise item identification device 2B that differs from that of the first embodiment. Unlike the merchandise item identification device 2 of the first embodiment (see FIG. 2), the merchandise item identification device 2B does not include the right photoelectric sensor 26R and the left photoelectric sensor 26L. Other than that, the merchandise item identification device 2A has the same structure as the merchandise item identification device 2 of the first embodiment.

The merchandise item identification device 2B of the third embodiment senses an object in the areas to the right and the left of the read window 52, and recognizes the object in the recognition area at the center of the read window 52. By doing so, the merchandise item identification device 2B identifies a merchandise item. Therefore, the right photoelectric sensor 26R and the left photoelectric sensor 26L are unnecessary. The camera 27 in the third embodiment is an imaging unit that captures an image including the merchandise item recognition area, a first area located on one side of the recognition area, and a second area located on the other side of the recognition area.

From the image captured by the camera 27, the CPU 211 senses an object from the right and left areas, senses the object from the recognition area at the center, and identifies a merchandise item. In accordance with the temporal sequence of these results of sensing, the CPU 211 further causes the POS terminal 3 to perform a merchandise item registration process or a merchandise item registration cancellation process.

In a case where the merchandise item identification device 2B of the third embodiment senses an object in the left area, recognizes the object in the recognition area at the center of the read window 52, and identifies a merchandise item, the merchandise item identification device 2B provisionally registers this merchandise item. In a case where the merchandise item identification device 2B senses an object in the right area, recognizes the object in the recognition area at the center of the read window 52, and identifies a merchandise item, on the other hand, the merchandise item identification device 2B corrects (cancels) provisional registration of this merchandise item.

Figure 13A:
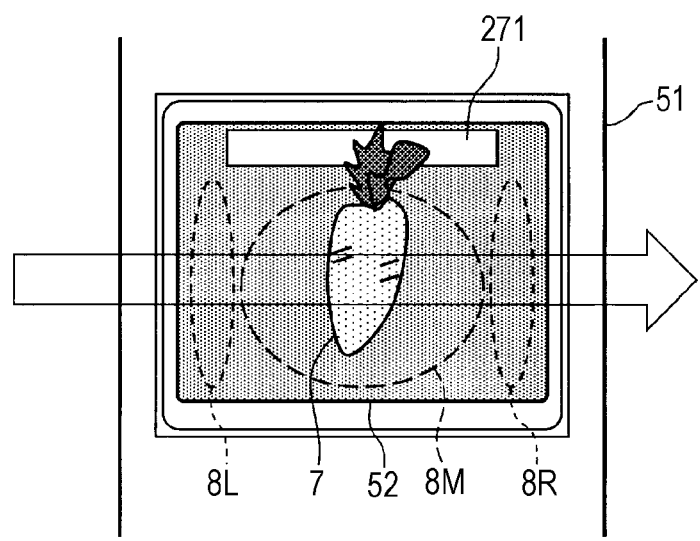
FIGS. 13A and 13B are diagrams for explaining a merchandise item registering operation and a merchandise item registration correcting operation according to the third embodiment.
Figure 13B:
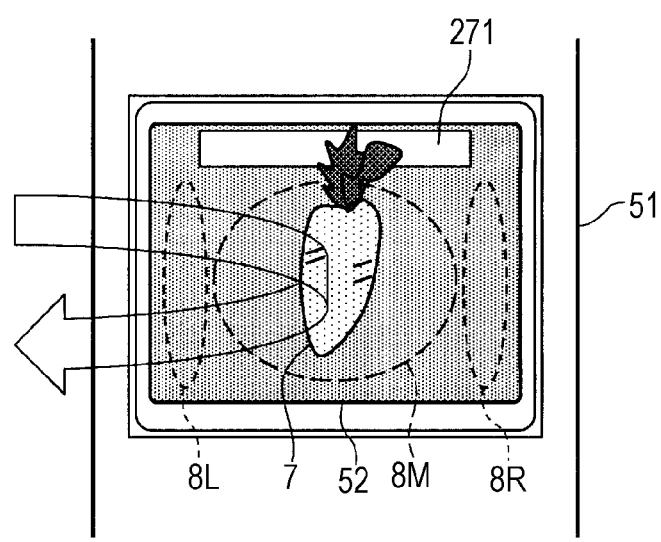

FIGS. 13A and 13B are diagrams for explaining a merchandise item registering operation and a merchandise item registration correcting operation according to the third embodiment.

FIG. 13A is a diagram for explaining a merchandise item registering operation.

As shown in FIG. 13A, the area in front of the read window 52 is divided into a left area 8L (the first area), a recognition area 8M at the center, and a right area 8R (the second area). The merchandise item identification device 2B can sense an object in the areas 8L and 8R.

Prior to a merchandise item registering operation, the operator holds a merchandise item taken out from the first shopping basket 4L, in front of the camera 27 through the read window 52. After that, the operator transfers the merchandise item into the second shopping basket 4R. This operation is the same as an operation of a conventional merchandise item registration apparatus, and is an intuitive and natural operation.

At this point, the merchandise item identification device 2B senses an object from an image captured by the camera 27. After sensing an object in the left area 8L, the merchandise item identification device 2B senses the object in the recognition area 8M, and identifies a merchandise item. After that, the merchandise item identification device 2B senses the object in the right area 8R.

In this manner, a merchandise item registering operation can be specified in accordance with the temporal sequence of results of object sensing in the areas 8L and 8R, and a result of object sensing in the recognition area 8M.

FIG. 13B is a diagram for explaining a correcting operation to be performed immediately after provisional registration of a merchandise item.

Prior to a provisional registering operation, the operator holds a merchandise item taken out from the first shopping basket 4L, in front of the camera 27 through the read window 52. The merchandise item is then identified Immediately after that, the operator returns the merchandise item into the first shopping basket 4L, and cancels provisional registration. This operation is an intuitive and natural operation.

At this point, the merchandise item identification device 2B senses an object from an image captured by the camera 27. After sensing an object in the left area 8L, the merchandise item identification device 2B senses the object in the recognition area 8M, and identifies a merchandise item. After that, the merchandise item identification device 2B again senses the object in the left area 8L.

In this manner, a correcting operation immediately after provisional registration of a merchandise item can be specified in accordance with the temporal sequence of results of object sensing in the areas 8L and 8R, and a result of object sensing in the recognition area 8M.

Figure 14A:
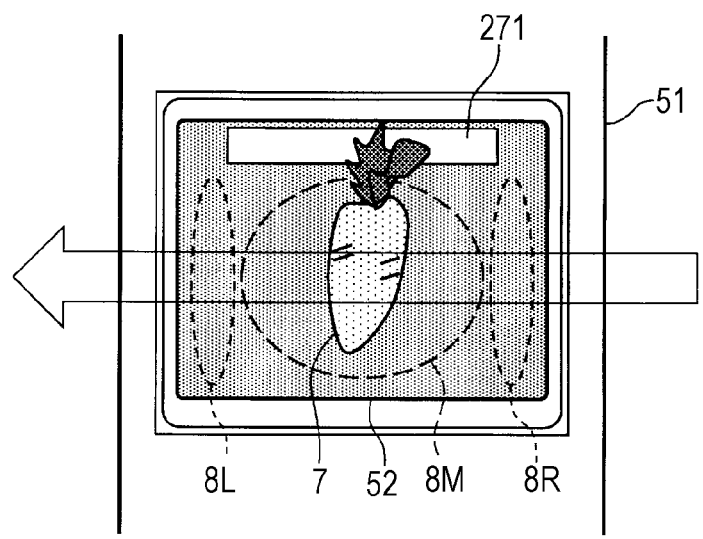
FIGS. 14A and 14B are diagrams for explaining a merchandise item registration correcting operation and a merchandise item re-registering operation according to the third embodiment.
Figure 14B:
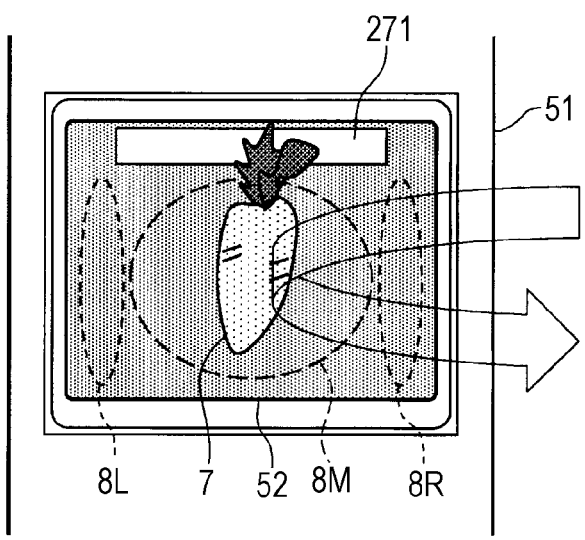

FIGS. 14A and 14B are diagrams for explaining a merchandise item registration correcting operation and a merchandise item re-registering operation according to the third embodiment.

FIG. 14A is a diagram for explaining a merchandise item registration correcting operation.

A merchandise item registration correcting operation in this example is an operation to correct (cancel) a provisionally-registered merchandise item put into the second shopping basket 4R. This operation differs from the operation to perform correction immediately after registration as shown in FIG. 13B.

Prior to a merchandise item registration correcting operation, the operator holds a merchandise item taken out from the second shopping basket 4R, in front of the camera 27 through the read window 52. After that, the operator returns the merchandise item into the first shopping basket 4L. This operation is performed in the reverse order of the merchandise item provisional registering operation, and is an intuitive and natural operation.

At this point, the merchandise item identification device 2B senses an object from an image captured by the camera 27. After sensing an object in the right area 8R, the merchandise item identification device 2B senses the object in the recognition area 8M, and identifies a merchandise item. After that, the merchandise item identification device 2B senses the object in the left area 8L.

In this manner, a merchandise item registration correcting operation can be specified in accordance with the temporal sequence of results of object sensing in the areas 8L and 8R, and a result of object sensing in the recognition area 8M.

FIG. 14B is a diagram for explaining a re-registering operation to be performed immediately after a merchandise item registration correcting operation.

In a merchandise item registration correcting operation, the operator holds a merchandise item taken out from the second shopping basket 4R, in front of the camera 27 through the read window 52. The operator then suspends the correction, returns the merchandise item into the second shopping basket 4R, and again provisionally registers the merchandise item. This operation is performed in the reverse order of canceling a merchandise item provisional registering operation, and is an intuitive and natural operation.

At this point, the merchandise item identification device 2B senses an object from an image captured by the camera 27. After sensing an object in the right area 8R, the merchandise item identification device 2B senses the object in the recognition area 8M, and again senses the object in the right area 8R.

In this manner, a re-registering operation after a merchandise item registration correcting operation can be specified in accordance with the temporal sequence of results of object sensing in the areas 8L and 8R, and a result of object sensing in the recognition area 8M.

Figure 15:
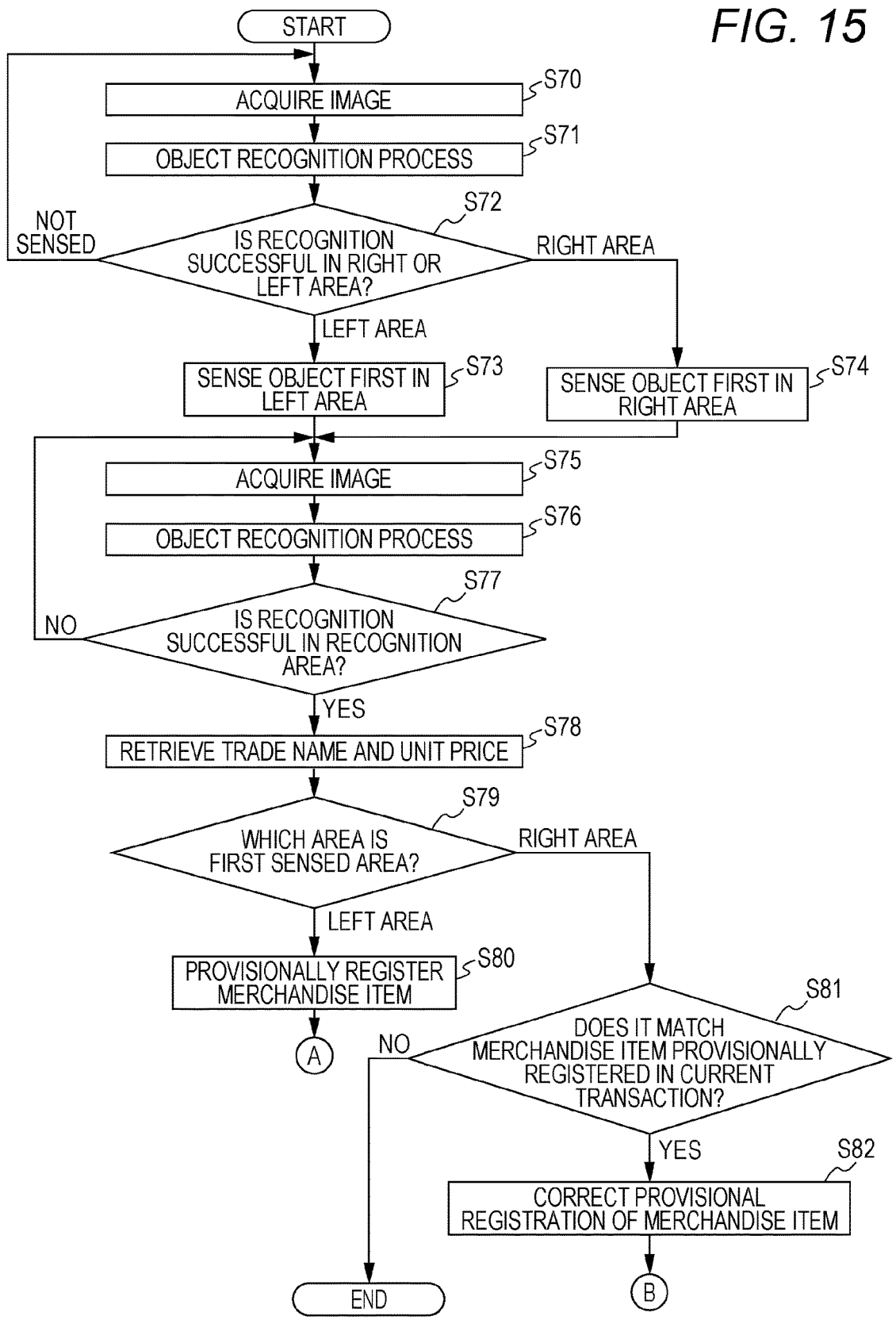
FIG. 15 is a flowchart (part 1) showing a merchandise item registration/correction process according to the third embodiment.

FIG. 15 is a flowchart (part 1) showing a merchandise item registration/correction process according to the third embodiment.

In step S70, the image acquiring unit 90 outputs an imaging on-state signal to the camera 27, so that the camera 27 starts capturing (imaging) a merchandise item image. The image acquiring unit 90 acquires the frame image (captured image) that has been captured by the camera 27 and been stored into the RAM 213.

In step S71, the object detecting unit 91 performs an object recognition process on the frame image acquired by the image acquiring unit 90, and tries to recognize (detect) all or part of the object that is the merchandise item.

In step S72, a check is made to determine whether the object detecting unit 91 has successfully recognized all or part of the object that is the merchandise item in the area 8L or 8R. If the object detecting unit 91 has successfully recognized the object in the left area 8L (Left Area), the process moves on to step S73. If the object detecting unit 91 has successfully recognized the object in the right area 8R (Right Area), the process moves on to step S74. If the object detecting unit 91 has not successfully recognized the object (Not Sensed), the process returns to step S70.

In step S73, the CPU 211 stores information indicating that the object has been first sensed in the left area 8L, and the process moves on to step S75. At this point, the operator has already taken out the merchandise item from the first shopping basket 4L, and transferred the merchandise item to the left area 8L.

In step S74, the CPU 211 stores information indicating that the object has been first sensed in the right area 8R. At this point, the operator has already taken out the merchandise item from the second shopping basket 4R, and transferred the merchandise item to the right area 8R.

The procedures in steps S75 and S76 are the same as the procedures in steps S70 and S71.

In step S77, a check is made to determine whether the object detecting unit 91 has successfully recognized all or part of the object that is the merchandise item in the recognition area 8M. If the object detecting unit 91 has successfully recognized the object that is the merchandise item (Yes), the process moves on to step S78. If the object detecting unit 91 has not successfully recognized the object (No), the process returns to step S75.

In step S78, the similarity calculating unit 93 reads a feature amount of the merchandise item from an image showing all or part of the merchandise item. The similarity determining unit 94 further determines whether the feature amount file 361 contains an available merchandise item having a degree of similarity equal to or higher than a predetermined threshold value, and retrieves the trade name and the unit price of the merchandise item. As a result, the merchandise item identification device 2B can determine the merchandise item.

In step S79, the CPU 211 determines which one of the areas 8L and 8R is the area in which the object has been first sensed. If the CPU 211 determines that the area in which the object has been first sensed is the left area 8L (Left Area), the process moves on to step S80. If the CPU 211 determines that the area in which the object has been first sensed is the right area 8R (Right Area), the process moves on to step S81.

In step S80, the information outputting unit 98 outputs the merchandise item ID and the like of the determined available merchandise item to the POS terminal 3, and causes the POS terminal 3 to conduct provisional registration. The sales registering unit 991 of the POS terminal 3 provisionally registers the merchandise item based on the merchandise item ID. At this point, the operator has already taken out the merchandise item from the first shopping basket 4L, transferred the merchandise item to the recognition area 8M via the left area 8L, and held the merchandise item in front of the camera 27.

Figure 16A:
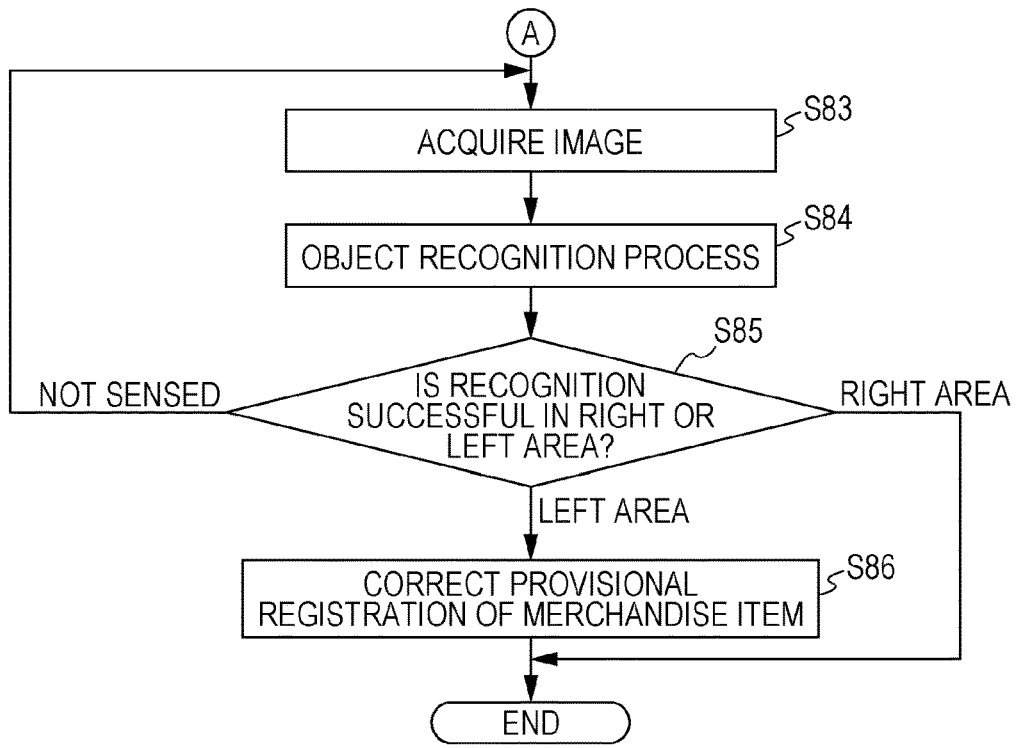
FIGS. 16A and 16B are the flowchart (part 2) showing the merchandise item registration/correction process according to the third embodiment.

After the procedure in step S80, the process moves on to step S83 in FIG. 16A via a node A.

In step S81, the determination notifying unit 95 determines whether the determined merchandise item matches a merchandise item provisionally registered in the current transaction. If the determination notifying unit 95 determines that the determined merchandise item matches a merchandise item provisionally registered in the current transaction (Yes), the process moves on to step S82. If the determination notifying unit 95 determines that the determined merchandise item does not match any merchandise item provisionally registered in the current transaction (No), the process shown in FIG. 15 comes to an end.

In step S82, the information outputting unit 98 outputs the merchandise item ID and the like of the determined available merchandise item to the POS terminal 3, and causes the POS terminal 3 to correct the provisional registration of the merchandise item. The sales canceling unit 992 of the POS terminal 3 corrects (cancels) the provisional registration of the merchandise item based on the merchandise item ID. At this point, the operator has already taken out the merchandise item from the second shopping basket 4R, transferred the merchandise item to the recognition area 8M via the right area 8R, and held the merchandise item in front of the camera 27.

Figure 16B:
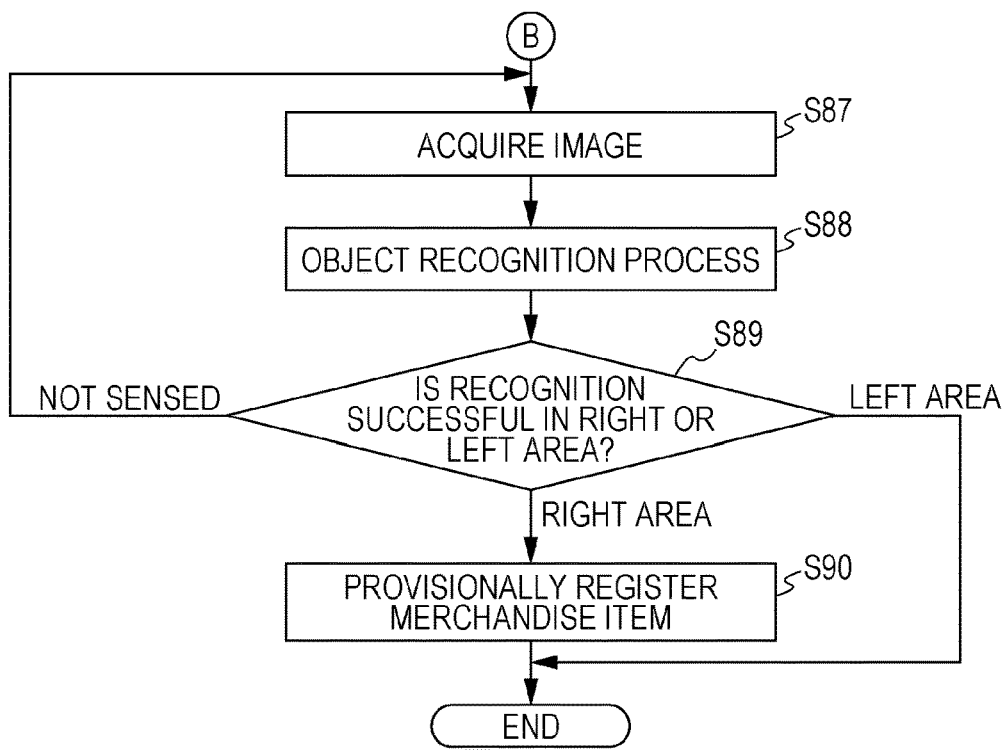

After the procedure in step S82, the process moves on to step S87 in FIG. 16B via a node B.

FIGS. 16A and 16B are the flowchart (part 2) showing the merchandise item registration/correction process according to the third embodiment.

FIG. 16A shows the series of procedures to be carried out after step S80 in FIG. 15.

The procedures in steps S83 and S84 are the same as the procedures in steps S70 and S71 (see FIG. 15).

In step S85, a check is made to determine whether the object detecting unit 91 has successfully recognized all or part of the object that is the merchandise item in the area 8L or 8R. If the object detecting unit 91 has successfully recognized the object in the left area 8L (Left Area), the process moves on to step S86. If the object detecting unit 91 has successfully recognized the object in the right area 8R (Right Area), the process shown in FIG. 16A comes to an end. If the object detecting unit 91 has not successfully recognized the object (Not Sensed), the process returns to step S83.

In step S86, the information outputting unit 98 outputs the merchandise item ID and the like of the available merchandise item determined in step S78 (see FIG. 15) to the POS terminal 3, and causes the POS terminal 3 to correct the provisional registration of the merchandise item. The sales canceling unit 992 of the POS terminal 3 corrects (cancels) the provisional registration of the merchandise item based on the merchandise item ID. At this point, the operator has already taken out the merchandise item from the first shopping basket 4L, transferred the merchandise item to the recognition area 8M via the left area 8L, held the merchandise item in front of the camera 27, and returned the merchandise item back into the first shopping basket 4L (see FIG. 13B).

When the procedure in step S86 is completed, the process shown in FIG. 16A comes to an end.

FIG. 16B shows the series of procedures to be carried out after step S81 in FIG. 15.

The procedures in steps S87 and S88 are the same as the procedures in steps S70 and S71 (see FIG. 15).

In step S89, a check is made to determine whether the object detecting unit 91 has successfully recognized all or part of the object that is the merchandise item in the area 8L or 8R. If the object detecting unit 91 has successfully recognized the object in the left area 8L (Left Area), the process moves on to step S90. If the object detecting unit 91 has successfully recognized the object in the right area 8R (Right Area), the process shown in FIG. 16B comes to an end. If the object detecting unit 91 has not successfully recognized the object (Not Sensed), the process returns to step S87.

In step S90, the information outputting unit 98 outputs the merchandise item ID and the like of the available merchandise item determined in step S78 (see FIG. 15) to the POS terminal 3, and causes the POS terminal 3 to perform provisional registration. The sales registering unit 991 of the POS terminal 3 provisionally registers the merchandise item based on the merchandise item ID. At this point, the operator has already taken out the merchandise item from the second shopping basket 4R, transferred the merchandise item to the recognition area 8M via the right area 8R, held the merchandise item in front of the camera 27, and returned the merchandise item back into the second shopping basket 4R (see FIG. 14B).

When the procedure in step S90 is completed, the process shown in FIG. 16B comes to an end.

Figure 17:
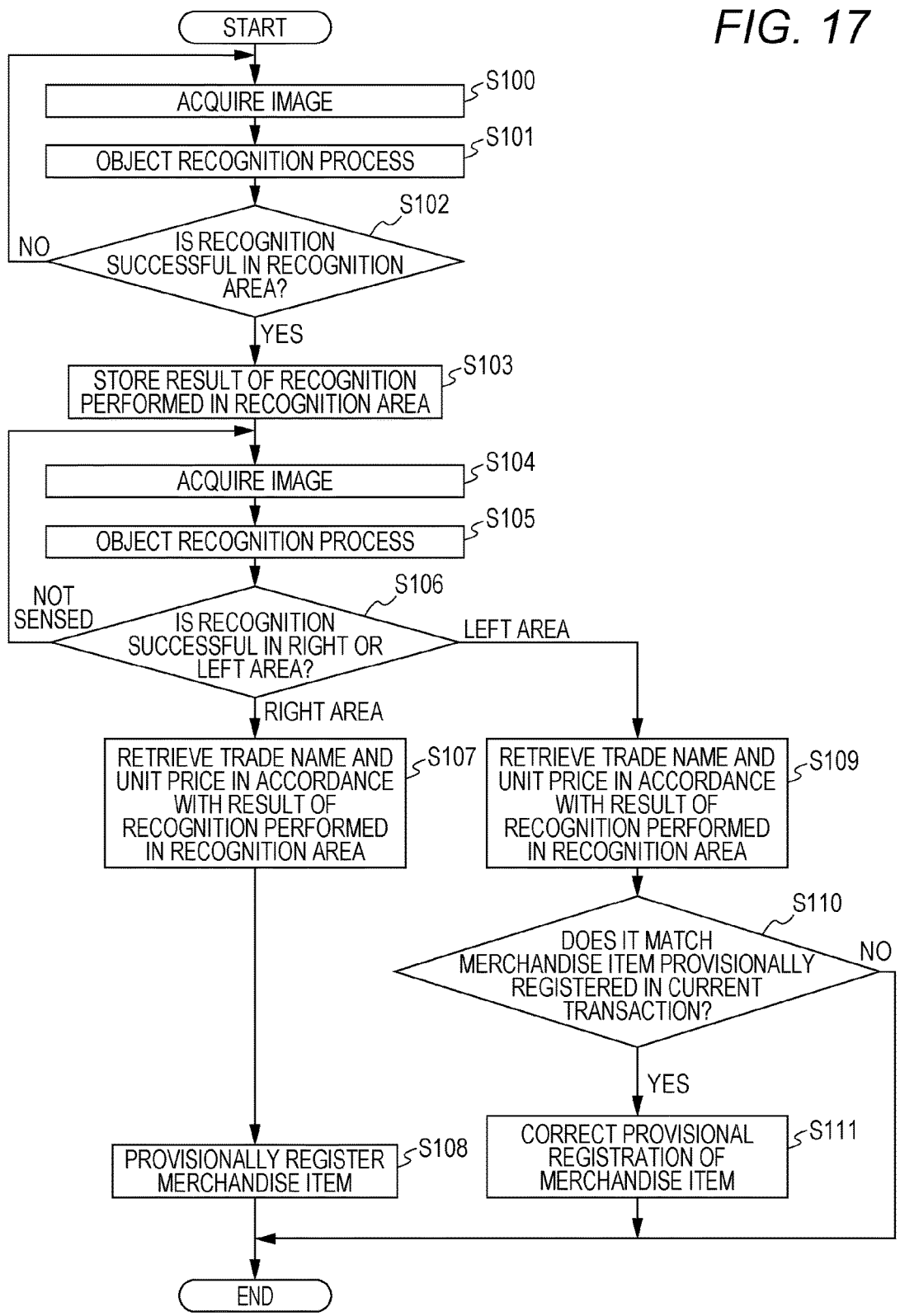
FIG. 17 is a flowchart showing a merchandise item registration/cancellation process according to a modification of the third embodiment.

FIG. 17 is a flowchart showing a merchandise item registration/cancellation process according to a modification of the third embodiment.

In this modification, a merchandise item registration process or a merchandise item registration cancellation process is performed depending on which one of the right and left shopping baskets 4 the operator puts a merchandise item into after identifying the merchandise item in the recognition area 8M. In this modification, the direction (from left to right, or from right to left) in which a merchandise item is transferred to the recognition area 8M is not relevant.

The procedures in steps S100 and S101 are the same as the procedures in steps S70 and S71 (see FIG. 15).

In step S102, a check is made to determine whether the object detecting unit 91 has successfully recognized all or part of the object that is the merchandise item in the recognition area 8M. If the object detecting unit 91 has successfully recognized the object that is the merchandise item (Yes), the process moves on to step S103. If the object detecting unit 91 has not successfully recognized the object (No), the process returns to step S100.

In step S103, the object detecting unit 91 stores a result of object recognition performed in the recognition area 8M.

The procedures in steps S104 and S105 are the same as the procedures in steps S70 and S71 (see FIG. 15).

In step S106, a check is made to determine whether the object detecting unit 91 has successfully recognized all or part of the object that is the merchandise item in the area 8L or 8R. If the object detecting unit 91 has successfully recognized the object in the right area 8R (Right Area), the process moves on to step S107. If the object detecting unit 91 has successfully recognized the object in the left area 8L (Left Area), the process moves on to step S109. If the object detecting unit 91 has not successfully recognized the object (Not Sensed), the process returns to step S104.

In step S107, the similarity calculating unit 93 reads a feature amount of the merchandise item from the image with which the recognition was successful in step S102. The similarity determining unit 94 further determines whether the feature amount file 361 contains an available merchandise item having a degree of similarity equal to or higher than a predetermined threshold value, and retrieves the trade name and the unit price of the merchandise item. As a result, the merchandise item identification device 2B can determine the merchandise item.

In step S108, the information outputting unit 98 outputs the merchandise item ID and the like of the determined available merchandise item to the POS terminal 3, and causes the POS terminal 3 to conduct provisional registration. The sales registering unit 991 of the POS terminal 3 provisionally registers the merchandise item based on the merchandise item ID. When the procedure in step S108 is completed, the process shown in FIG. 17 comes to an end.

The procedure in step S109 is the same as the procedure in step S107.

In step S110, the determination notifying unit 95 determines whether the determined merchandise item matches a merchandise item provisionally registered in the current transaction. If the determination notifying unit 95 determines that the determined merchandise item matches a merchandise item provisionally registered in the current transaction (Yes), the process moves on to step S111. If the determination notifying unit 95 determines that the determined merchandise item does not match any merchandise item provisionally registered in the current transaction (No), the process shown in FIG. 17 comes to an end.

In step S111, the information outputting unit 98 outputs the merchandise item ID and the like of the determined available merchandise item to the POS terminal 3, and causes the POS terminal 3 to correct the provisional registration of the merchandise item. The sales canceling unit 992 of the POS terminal 3 corrects (cancels) the provisional registration of the merchandise item based on the merchandise item ID. When the procedure in step S111 is completed, the process shown in FIG. 17 comes to an end.

As described above, after the operator causes the merchandise item identification device 2B to recognize a merchandise item, the merchandise item is transferred through one of the right and left areas 8L and 8R, so that a merchandise item registration process or a merchandise item registration correction (cancellation) process can be performed. Accordingly, the merchandise item identification device 2B can perform a merchandise item registration process that is an intuitive operation and results in few false operations, and can also perform a cancellation process on the merchandise item registration, without any keyboard operation.

Modifications

The present invention is not limited to the above described embodiments, and modifications can be made to them without departing from the scope of the invention. For example, the modifications (a) through (d) described below may be made.

a) Identification of a merchandise item is not limited to object recognition. For example, a bar-code scanner or a bar-code reader may be incorporated into the read window, and a bar code or the like printed on a merchandise item may be read so that the merchandise item can be identified.

b) The positions of the sensors are not limited to the right and left sides of the recognition area (the read window), and the sensors may be placed above and below the recognition area. Alternatively, one of the sensors may be placed in a position close to the read window (camera), and the other one of the sensors may be placed in a position at a distance from the read window (camera). In this case, the area interposed between the sensing areas of both sensors serves as the merchandise item recognition area for the camera.

c) The sensing units in the right and left areas are not limited to photoelectric sensors, as long as the sensing units are sensors that can sense objects. For example, the sensing units may be ultrasonic sensors, laser sensors, or infrared sensors.

d) There may be any type of correspondence between the temporal sequence of results of sensing of a merchandise item in the respective areas, and a merchandise item registration process and a merchandise item registration cancellation process. For example, when a merchandise item is recognized in the recognition area after an object is first sensed in the right area, the POS terminal may be made to perform a merchandise item registration process. When a merchandise item is recognized in the recognition area after an object is first sensed in the left area, the POS terminal may be made to perform a merchandise item registration cancellation process.

The invention claimed is:

1. A merchandise item registration apparatus comprising:
a sensor configured to sense an object in a sensing area adjacent to a recognition area for merchandise items;
a camera configured to capture an image of the recognition area; and
one or more processors configured to:
identify a merchandise item by recognizing the object from the image of the recognition area captured by the camera; and
perform one of a merchandise item provisional registration process, a provisional registration cancellation process and a merchandise item return process in accordance with a temporal sequence of respective results of the sensing performed in the sensing area and the recognizing performed in the recognition area,
wherein the one or more processors are configured to perform the merchandise item provisional registration process in a case where the temporal sequence of respective results of the sensing performed in the sensing area and the recognizing performed in the recognition area is a first temporal sequence, and
wherein the one or more processors are configured to perform the provisional registration cancellation process when the identified merchandise item is a merchandise item provisionally registered by the merchandise item provisional registration process, and perform the merchandise item return process when the identified merchandise item is not a merchandise item provisionally registered by the merchandise item provisional registration process, in a case where the temporal sequence of respective results of the sensing performed in the sensing area and the recognizing performed in the recognition area is a second temporal sequence which is different from the first temporal sequence.

2. The merchandise item registration apparatus according to claim 1,
wherein the sensor is configured to sense a predetermined color, and
wherein, when the sensor senses the predetermined color, the one or more processors are configured to discount the merchandise item during the merchandise item registration process.

3. The merchandise item registration apparatus according to claim 1,
wherein the sensor comprises:
a first sensor configured to sense the object in a first area of the sensing area located on a first side of the recognition area; and
a second sensor configured to sense the object in a second area of the sensing area located on a second side of the recognition area.

4. The merchandise item registration apparatus according to claim 3,
wherein the one or more processors are configured to perform the merchandise item provisional registration process in a case where the one or more processors identifies the merchandise item by recognizing the object from the image of the recognition area captured by the camera after the first sensor senses the object in the first area, and
wherein the one or more processors are configured to perform the provisional registration cancellation process when the identified merchandise item is a merchandise item provisionally registered by the merchandise item provisional registration process and perform the merchandise item return process when the identified merchandise is not a merchandise item provisionally registered by the merchandise item provisional registration process, in a case where the one or more processors identifies the merchandise item by recognizing the object from the image of the recognition area captured by the camera after the second sensor senses the object in the second area.

5. The merchandise item registration apparatus according to claim 3,
wherein the one or more processors are configured to:
perform the merchandise item provisional registration process in a case where the first sensor senses the object in the first area after the one or more processors identifies the merchandise item by recognizing the object from the image of the recognition area captured by the camera; and
perform the provisional registration cancellation process when the identified merchandise item is a merchandise item provisionally registered by the merchandise item provisional registration process and perform the merchandise item return process when the identified merchandise item is not a merchandise item provisionally registered by the merchandise item provisional registration process, in a case where the second sensor senses the object in the second area after identifying the merchandise item by recognizing the object from the image of the recognition area captured by the camera.

6. The merchandise item registration apparatus according to claim 3,
wherein, when the one or more processors recognizes the object in the recognition area after the first sensor senses the object in the first area, the one or more processors are configured to perform one of the merchandise item provisional registration process and the provisional registration cancellation process in accordance with the temporal sequence of respective results of the sensing performed in the first area and the recognizing performed in the recognition area, and
wherein when the first sensor again senses the object in the first area thereafter, the one or more processors are configured to cancel the one of the merchandise item provisional registration process and the provisional registration cancellation process performed in accordance with the temporal sequence of the results of the sensing performed in the first area and the recognizing performed in the recognition area.

7. The merchandise item registration apparatus according to claim 3,
wherein the one or more processors are configured to:
perform the merchandise item provisional registration process on a merchandise item being transferred in the same direction as a transfer direction of the first merchandise item; and
perform the provisional registration cancellation process or the merchandise item return process on a merchandise item being transferred in the opposite direction from the transfer direction.

8. The merchandise item registration apparatus according to claim 3,
wherein the processor is configured to:
recognize the object through object recognition from the image of the recognition area captured by the camera; and
determine to which merchandise item the object corresponds in accordance with a degree of similarity between the image of the recognition area captured by the camera and a reference image of each available merchandise item recorded in a dictionary.

9. The merchandise item registration apparatus according to claim 3,
wherein the one or more processors are configured to identify the merchandise item by recognizing a data code provided with the object from the image of the recognition area captured by the camera.

10. A method comprising:
controlling a sensor to sense an object in a sensing area adjacent to a recognition area for merchandise items;
controlling a camera to capture an image of the recognition area;
identifying, by one or more processors, a merchandise item by recognizing the object from the image of the recognition area captured by the camera; and
performing, by the one or more processors, a merchandise item provisional registration process, a provisional registration cancellation process and a merchandise item return process in accordance with a temporal sequence of respective results of the sensing performed in the sensing area and the recognizing performed in the recognition area,
wherein in a case where the temporal sequence of respective results of the sensing performed in the sensing area and the recognizing performed in the recognition area is a first temporal sequence, the merchandise item provisional registration process is performed by the one or more processors, and
wherein in a case where the temporal sequence of respective results of the sensing performed in the sensing area and the recognizing performed in the recognition area is a second temporal sequence which is different from the first temporal sequence, the provisional registration cancellation process is performed by the one or more processors when the identified merchandise item is a merchandise item provisionally registered by the merchandise item provisional registration process, and the merchandise item return process is performed by the one or more processors when the identified merchandise item is not a merchandise item provisionally registered by the merchandise item provisional registration process.

* * * * *